US010622839B2

(12) United States Patent
Van Neste et al.

(10) Patent No.: US 10,622,839 B2
(45) Date of Patent: Apr. 14, 2020

(54) ELECTRICAL ENERGY TRANSFER

(71) Applicant: THE GOVERNORS OF THE UNIVERSITY OF ALBERTA, Edmonton (CA)

(72) Inventors: Charles William Van Neste, Edmonton (CA); Thomas George Thundat, Edmonton (CA); John Errington Hawk, Edmonton (CA); Richard Hull, Edmonton (CA); Jonathan Backs, Edmonton (CA); Nurichi Guseynov, Edmonton (CA); Arindam Phani, Edmonton (CA)

(*) Notice: Subject to any disclaimer, the term of this patent is extended or adjusted under 35 U.S.C. 154(b) by 47 days.

(21) Appl. No.: 15/035,452

(22) PCT Filed: Nov. 7, 2014

(86) PCT No.: PCT/CA2014/051079
§ 371 (c)(1),
(2) Date: May 9, 2016

(87) PCT Pub. No.: WO2015/066818
PCT Pub. Date: May 14, 2015

(65) Prior Publication Data
US 2016/0285314 A1    Sep. 29, 2016

Related U.S. Application Data

(60) Provisional application No. 61/902,051, filed on Nov. 8, 2013.

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 50/00* (2016.02); *H02J 50/40* (2016.02); *H02J 50/05* (2016.02)

(58) Field of Classification Search
CPC ........................................................ H02J 50/12
(Continued)

(56) References Cited

U.S. PATENT DOCUMENTS 645,576 A    3/1900 Tesla
787,412 A    4/1905 Tesla
(Continued)

FOREIGN PATENT DOCUMENTS

CA    142352    8/1912
EP    1337001    8/2003
(Continued)

OTHER PUBLICATIONS

International Search Report and the Written Opinion of the International Searching Authority for PCT/CA2014/051079; dated Jan. 20, 2015; p. 1-10.

*Primary Examiner* — Metasebia T Retebo
(74) *Attorney, Agent, or Firm* — Foley & Lardner LLP

(57) ABSTRACT

An electrical source excites a conductive object. A receiver is electrically connected to the object to receive energy from the object, and can power a device. The object can be non-resonant under excitation by the source, and the receiver is excited into resonance by electrical contact with the object. The object can also be resonant under the excitation by the source, and the receiver receives energy from the resonance of the object.

29 Claims, 15 Drawing Sheets

(51) Int. Cl.
*H02J 50/40* (2016.01)
*H02J 50/00* (2016.01)
*H02J 50/05* (2016.01)

(58) Field of Classification Search
USPC .......................................................... 307/104
See application file for complete search history.

(56) References Cited

U.S. PATENT DOCUMENTS

| | | | |
|---|---|---|---|
| 6,173,899 B1 | 1/2001 | Rozin | |
| 7,053,576 B2 | 5/2006 | Correa | |
| 8,986,125 B2 * | 3/2015 | Ellsworth | ............... A63F 13/00 |
| | | | 463/47 |
| 9,478,992 B2 * | 10/2016 | Hosotani | ................. H02J 5/005 |
| 2010/0225272 A1 * | 9/2010 | Kirby | ....................... H04B 5/00 |
| | | | 320/108 |
| 2010/0322228 A1 * | 12/2010 | Noel | ........................ H04B 5/02 |
| | | | 370/345 |
| 2011/0080050 A1 | 4/2011 | Thundat et al. | |
| 2011/0156494 A1 | 6/2011 | Mashinsky | |
| 2011/0300801 A1 * | 12/2011 | Kerselaers | ........... H04B 5/0031 |
| | | | 455/41.1 |
| 2014/0213184 A1 * | 7/2014 | Matsubara | ........... H04B 5/0031 |
| | | | 455/41.1 |
| 2014/0217969 A1 * | 8/2014 | Murakami | ............. H02J 7/0044 |
| | | | 320/108 |
| 2016/0013667 A1 * | 1/2016 | Hosotani | ............. H01F 27/2804 |
| | | | 307/104 |

FOREIGN PATENT DOCUMENTS

| | | |
|---|---|---|
| WO | 2013033028 | 9/2013 |
| WO | 2013140262 | 9/2013 |

\* cited by examiner

ELECTRICAL ENERGY TRANSFER

TECHNICAL FIELD

Electrical energy transfer

BACKGROUND

Conventionally, electrical power from a source is transmitted to a load through two separate pathways, a transmitting path composed of an electrical body (where current leaves the source and enters the load) and a return path composed of a second electrical body. An electrical body may be defined as any object that allows the propagation of electrical energy of any magnitude. The connection of either the transmitting path or return path to the load may be a direct connection or a capacitive coupling where a time alternating electric field induces movement of charge in the load.

A conventional method is to use a direct connection from a source to a load through conducting metal wires. In this method, both transmitting and return paths are physical conducting wires.

Other conventional methods utilize a direct connection from source to load through one physical wire and the other connection through capacitive coupling between the source and either adjacent conductors or the physical wire's self-capacitance. Such systems may either have a capacitively coupled transmitting path and a physical wire return path, or the reverse. Other methods utilize a transformer to resonantly increase the voltage or charge distribution along a single conductor then step the voltage or charge distribution down with another transformer to operate a load. Such systems may also involve a DC rectification stage at the end of the singe wire in place of a second transformation stage to convert the high voltage AC to DC in order to operate an electric load.

So far as known to the inventors, conventional methods making use of a single wire transmission line require one or more transformation processes which do not make use of the natural potential or voltage gradient developed from a standing wave on an electrical body. In addition, the object bridging the connection between one transformation system and the other is placed under a very high potential making interaction with that object dangerous.

Every electrical body has both a self-capacitance and a self-inductance. A conducting object placed in a perfect vacuum and isolated from surrounding matter by a distance of infinity will still possess both of these properties. Self-inductance is defined as a phenomenon which occurs when an applied current through an electrical body induces a countering current within the same electrical body.

An electrical resonator is made up of electrical elements known as a capacitor and an inductor connected together. Energy placed in one of the electrical elements will transfer to the other element and then back to the original and repeat the cycle many times—setting up a resonant oscillation that continues until the energy is dissipated from losses. This resonance will have a specific range of frequencies where the oscillations take place. This type of circuit is known as a tank circuit in the art. It is also well known in the art that the self-capacitance and self-inductance of an electrical body may form a tank circuit at a specific frequency, or set of frequencies.

U.S. Pat. Nos. 645,576, 649,621, 787,412 and Canadian patent 142,352 describe methods of transmission whereby the resonant body is used as the transmission line. In these methods the electrical body is excited through the self-capacitance.

Electrical power may be transmitted from one location to another in a variety of methods. The most widely used is a two wire system where the electric current flows from the power source to the load and back to the power source through physical. Another well known method in the art is to utilize the earth as a return conductor. In such systems, the load must always have two direct connections with the power source. Other techniques to transmit electrical power operate without wires. This is done by using the magnetic coupling between two circuits. The wireless distance can be extended if the two circuits are both resonant at the same frequency. In addition to magnetic field coupling, the electric field may also be used to transfer power.

SUMMARY

In an embodiment, there is disclosed a receiver for receiving energy from a conductive object, the conductive object having a changing electrical voltage, a first end of the receiver being configured to be placed into electrical connection to the object and the receiver having an inductance and stray capacitance configured to be excited into resonance by the electrical connection to the object and to generate via the resonance a voltage within the receiver larger than the voltage of the object, and the receiver being configured to connect to a device to power the device using the resonance of the receiver. The receiver may have a connection for connecting to the device, the connection comprises a first electrical junction and second electrical junction for connecting the device between the first and second junctions. A portion of the inductance of the receiver may be disposed between the first and second electrical junctions. At a frequency of the resonance, the impedance of the portion of the inductance disposed between the first electrical junction and the second electrical junction functionally matches an impedance of a load provided by the device when the device is connected between the first and second junctions.

In further embodiments, any of the following may be present. The first junction is located at the first end of the receiver and the second junction is located at a position intermediate the first end and a second end of the receiver. The first junction is located at a position intermediate the first end and a second end of the receiver and the second junction is located at the second end of the receiver. The first junction and the second junction is each located intermediate the first end and a second end of the receiver. The first junction is located at the first end of the receiver and the second junction is located at a second end of the receiver. The connection for connecting to a device is in series with the inductance of the receiver. The receiver is configured to emit a magnetic field to couple to a magnetic coupling element connected to the device and to transmit energy from the receiver to the magnetic coupling element through the magnetic field coupling to power the device. The receiver is configured to emit an electric field to couple to an electrostatic coupling element connected to the device and to transmit energy from the receiver to the electrostatic coupling element through the electric field coupling to power the device.

In still further embodiments, the following may be present. The receiver comprises a coil. The receiver is configured to be movable over at least a portion of the conductive object. The receiver is configured to be at least intermittently in electrical connection to the object when in motion over the at least a portion of the conductive object. The receiver is configured to be placed into electrical connection to the object capacitively through a dielectric separating the receiver from at least a portion of the object.

In other embodiments, the receiver may be used with an electrical energy source configured to supply a changing electrical voltage to a conductive object to excite into resonance the receiver connected to the object. The energy source may be configured to supply a changing electrical voltage to the object at multiple frequencies, for example sequentially or simultaneously, to excite into resonance multiple receivers connected to the object.

In other embodiments, an energy source and received may be used together with a measuring device connected to the multiple receivers to measure a parameter of at least a portion of the electrical energy received by each receiver and a processor configured to receive the measured parameters from the one or more measuring devices to create a measured profile and to compare the measured profile to a stored profile to identify the object. The receivers may be connected to an electronic device and the electronic device may be configured to turn on conditional to the profile matching the stored profile. The receivers may receive electrical energy from the resonance at multiple frequencies and deliver the received energy to at least one connected electronic device. The receivers may be connected to an electronic device and the electronic device is configured to turn on conditional to the profile matching the stored profile, and the receivers may receive electrical energy from the resonance at multiple frequencies and deliver the received energy to the electronic device.

In a further embodiment, there is provided a method for transmitting electrical energy, comprising supplying electrical energy to a first portion of a conductive object having an accumulative spatial distribution of self-inductance and an accumulative spatial distribution of stray capacitance to excite at least a second portion of the object into resonance to produce an electrical standing wave around at least the second portion of the object, the resonance being dependent on the accumulative spatial distribution of self-inductance and the accumulative spatial distribution of self-capacitance; and obtaining electrical energy from the electrical standing wave at a receiver connected to a location at the second portion of the object.

In a further embodiment, there is provided a method for transmitting electrical energy, comprising supplying electrical energy to a first portion of a conductive object by connecting the first portion of the conductive object into a circuit supplying a changing electrical current through the first portion of the conductive object, the object having a self-inductance and stray capacitance, the supply of changing electrical current through the first portion of the conductive object exciting the self-inductance and stray capacitance into resonance, the resonance including a changing electrical current or voltage at a second portion of the object, and obtaining electrical energy from the resonance at a receiver connected to a location at the second portion of the object. The self-inductance may have an accumulative spatial distribution and the self-capacitance has an accumulative spatial distribution; and the resonance may be dependent on the accumulative spatial distribution of self-inductance and the accumulative spatial distribution of self-capacitance and produces a standing wave around at least the second portion of the object. The receiver may be put into resonance from the received electrical energy around the surface of the object. The receiver may comprise a connector to connect the device to receive energy directly from the object. The receiver may comprise a pair of connectors to connect the device to a pair of locations on the object to receive energy directly from the object. The second portion of the object may be magnetically coupled to the receiver. The second portion of the object may be capacitively coupled to the receiver. The resonance may comprise multiple frequencies. The method may comprise obtaining electrical energy from the resonance of the object at one or more additional receivers each located at respective additional locations at the object. The receiver connected to the location at the second portion may receive electrical energy at a first frequency, and each additional receiver at a respective additional location may receive electrical energy at a different respective frequency, and the source may be configured to supply electrical energy at the first frequency and each of the different respective frequencies simultaneously. The receiver connected to the location at the second portion may receive electrical energy at a first frequency, and each additional receiver at a respective additional location may receive electrical energy at a different respective frequency, and the source may be configured to supply electrical energy at one frequency at a time, and to supply electrical energy at each of the different respective frequencies in turn. In embodiments of this method, at least one receiver may be mobile over at least a portion of the object.

In a further embodiment, comprising an exemplary operational system, there is provided a method of transmitting electrical energy, comprising: supplying electrical energy to an object from an energy source to place a changing electrical voltage and current on the surface of the object; wherein the object supports the flow of at least a portion of a quantity of electricity; the object having an accumulative spatial distribution of self-inductance and stray-capacitance which is not in resonance with the supplied electrical energy; and electrically connecting a receiver to the surface of the object; wherein the receiver is excited into resonance by the electrical connection to the object; wherein the resonance of the receiver is at least partially due to an accumulative spatial distribution of self-inductance and stray-capacitance of the receiver and produces at least a partial electrical standing wave around the receiver; wherein a nodal point of the standing wave occurs around the surface of the object; and connecting at least one device to the receiver wherein the at least one device obtains electrical energy from the resonance of the receiver. A dielectric may separate the object from the receiver. The resonance of the receiver may comprise multiple frequencies. There may be also provided connecting additional receivers to the object, each additional receiver being excited into a respective additional resonance by electrical connection to the object, the respective additional resonance of each additional receiver being at least partially due to a respective accumulative spatial distribution of self-inductance and stray-capacitance of each additional receiver; and each additional connected receiver being connected to a respective device which obtains electrical energy from the resonance of the respective additional connected receiver.

In an exemplary operational system, any of the following may be present. The receiver is electrically connected to the object to obtain resonance at a first frequency, and each additional receiver is tuned to obtain respective resonances at a different respective frequency, and the source is configured to supply alternating electrical voltages and currents at the first frequency and each of the different respective frequencies simultaneously. The receiver is electrically connected to the object to obtain resonance at a first frequency, and each additional receiver is tuned to obtain respective resonances at a different respective frequency, and the source is configured to supply alternating electrical voltages and currents at one frequency at a time, and to supply alternating electrical voltages and currents at the first frequency and each of the different respective frequencies sequentially. The receiver is mobile over at least a portion of the object. The receiver is at least intermittently in electrical connection to the object when in motion over the at least a portion of the object. Additional connected receivers are connected to a single device. The magnetic field emitted from at least one receiver is coupled to additional receivers and energy from the first receiver in electrical connection to the object is transmitted to the additional receivers through the magnetic field coupling. The electric field emitted from at least one receiver is coupled to additional receivers and energy from the first receiver in electrical connection to the object is transmitted to the additional receivers through the electric field coupling. A single polarity of changing electric potential is applied to the surface of the object. Both polarities of changing electric potential are applied to the surface of the object, wherein locations on the surface of opposite polarity are separated by a dielectric.

In a method of identifying an object, there may be provided supplying electrical energy to at least a portion of the object according to any of the disclosed methods, connecting multiple receivers to the object wherein the resonance of each receiver is different, measuring a parameter of at least a portion of the electrical energy received by each receiver connected to the object to create a measured profile; and comparing the measured profile to a stored profile to identify the object. There may also be present: The receivers are connected to an electronic device and the electronic device is configured to turn on conditional to the profile matching the stored profile. The receivers receive electrical energy from the resonance at multiple frequencies and deliver the received energy to at least one connected electronic device.

In a method of energizing implanted devices in an object, there may be provided supplying electrical energy to at least a portion of the object according to any of the disclosed methods wherein the alternating electrical voltage and current on the surface of the object resonates at least one receiver, implanted devices obtaining energy from the resonance of the receivers. The receiver may be at least partially embedded in the object. The receiver may be located around the surface of the object, and at least one implanted device obtains energy from the resonance of the receiver through the magnetic coupling of the receiver to the implanted device. The receiver may be located around the surface of the object and at least one implanted device obtains energy from the resonance of the receiver through the electric coupling of the receiver to the implanted device.

In a further embodiment, there is provided a method of transmitting electrical energy, comprising supplying electrical energy to a first location around the surface of an object; wherein the object supports the flow of at least a portion of a quantity of electricity; wherein the electric energy is bound around the surface of the object which excites the object into resonance; wherein the resonance of the object is at least partially dependent on the accumulative spatial distribution of the self-inductance and the accumulative spatial distribution of the stray-capacitance of at least a portion of the object; wherein the accumulative spatial distribution of self-inductance with the accumulative spatial distribution of stray-capacitance produces at least a partial electrical standing wave around at least a portion of the surface of the object; and a receiver connected to a second location around the surface of the object obtains electrical energy from the resonance of at least a portion of the object. The receiver may be put into resonance from the received electrical energy around the surface of the object. The second location around the object may be magnetically coupled to the receiver. The second location around the object may be capacitively coupled to the receiver. The resonance may comprises multiple frequencies. The object may further comprise additional locations each connected to an additional respective receiver for obtaining energy from the resonance of the object. The receiver connected to the second location around the surface of the object may receive electrical energy at a first frequency, and each additional receiver at a respective additional location may receive electrical energy at a different respective frequency, and the source may be configured to supply electrical energy at the first frequency and each of the different respective frequencies simultaneously. The receiver connected to the second location around the surface of the object may receive electrical energy at a first frequency, and each additional receiver at a respective additional location may receive electrical energy at a different respective frequency, and the source may be configured to supply electrical energy at one frequency at a time, and to supply electrical energy at each of the different respective frequencies in turn. The receiver may be mobile. A device may be directly connected to a respective location around the surface of the object without the use of a receiver.

In a further embodiment, there is provided a method of determining a position of a receiver around an object, the steps comprising energizing the object according to any one of the disclosed methods wherein the resonance comprises a multitude of at least partial standing waves; and detecting a parameter of received electrical energy from the at least partial standing waves to determine the position of the receiver.

In a further embodiment, there is provided a method of transmitting electrical power or a system that is configured to carry out the method, comprising supplying electrical power to a first portion of an electrical body from an energy source to put the electrical body into resonance, the electrical body having a self-inductance and a self-capacitance; and a receiver connected to a second portion of the electrical body obtaining electrical power from the resonance of the electrical body. In this embodiment, any of the following may be present: The receiver obtains power from the resonance of the electrical body by utilizing a voltage difference between two points of the second portion of the electrical body. The second portion of the electrical body is magnetically coupled to the electrical body. The resonance of the electrical body comprises a standing wave. The electrical power is supplied to the first portion of the electrical body by exciting the self-inductance of the electrical body. Electrical power is supplied to the first portion of the electrical body by inducing a current in the first portion of the electrical body. Electrical power is supplied to the first portion of the electrical body by supplying a current to the first portion of the electrical body. The resonance comprises multiple frequencies. The electrical body further comprises additional portions each connected to an additional respective receiver for obtaining power from the resonance of the electrical body. The second portion is tuned to allow the receiver connected to the second portion to receive electrical power at a first frequency, and each of the additional portions is tuned to allow the respective receiver connected to the additional portion to receive electrical power at a different respective frequency, and the source is configured to supply electrical power at the first frequency and each of the different respective frequencies simultaneously. The second portion is tuned to allow the receiver connected to the second portion to receive electrical power at a first frequency, and each of the additional portions is tuned to allow the respective receiver connected to the additional portion to receive electrical power at a different respective frequency, and the source is configured to supply electrical power at one frequency at a time, and to supply electrical power at each of the different respective frequencies in turn. The first portion is a portion of a first part of the electrical body and the second portion is a portion of a second part of the electrical body, the first part not being attached to the second part, the first part having a first self-inductance and a first self-capacitance, and the second part having a second self-inductance and a second self-capacitance, the second part being placed adjacent to the first part to comprise the electrical body. A dielectric separates the first part and the second part while the second part is adjacent to the first part to comprise the electrical body. The ratio of the first self-capacitance to the first self-inductance is greater than the ratio of the second self-capacitance to the second self-inductance. The second self-inductance is higher than the first self-inductance. The first part comprises a mat or coil. The second portion is tuned to allow the receiver to receive power at a first frequency and each additional part is tuned to allow the respective receiver to receive power at a different respective frequency, and the source is configured to supply power at the first frequency and at each of the different respective frequencies simultaneously. The second portion is tuned to allow the receiver to receive power at a first frequency and each additional part is tuned to allow the respective receiver to receive power at a different respective frequency, and the source is configured to supply power at one frequency at a time, and to supply power at the first frequency and at each of the different respective frequencies in turn. The second part is a moving vehicle traversing the first part.

In a still further embodiment, there is provided a method of energizing an electrical body, the electrical body having a self-inductance and a self-capacitance, comprising supplying power to a first portion of the electrical body from an energy source by exciting the self-inductance of the electrical body to put the electrical body into an electrical resonance. The electrical body may be any of a wire, motor, generator, lamp, inductor, transformer, animal, plant, solar wind, section of the earth, section of a celestial body, the earth, or a celestial body. There may also be provided any of the following: The electrical body is a gas and the resonance comprises multiple standing waves, and the standing waves interfere constructively in the volume of the gas to cause an electrical breakdown in the volume of the gas. The electrical body is a portion of the earth and the volume of a gas is a volume of the earth's atmosphere. Using the electrical breakdown in the volume of the earth's atmosphere to extract power from a DC charge of the earth's atmosphere.

BRIEF DESCRIPTION OF THE FIGURES

Embodiments will now be described with reference to the figures, in which like reference characters denote like elements, by way of example, and in which.

DETAILED DESCRIPTION

Figure 1:
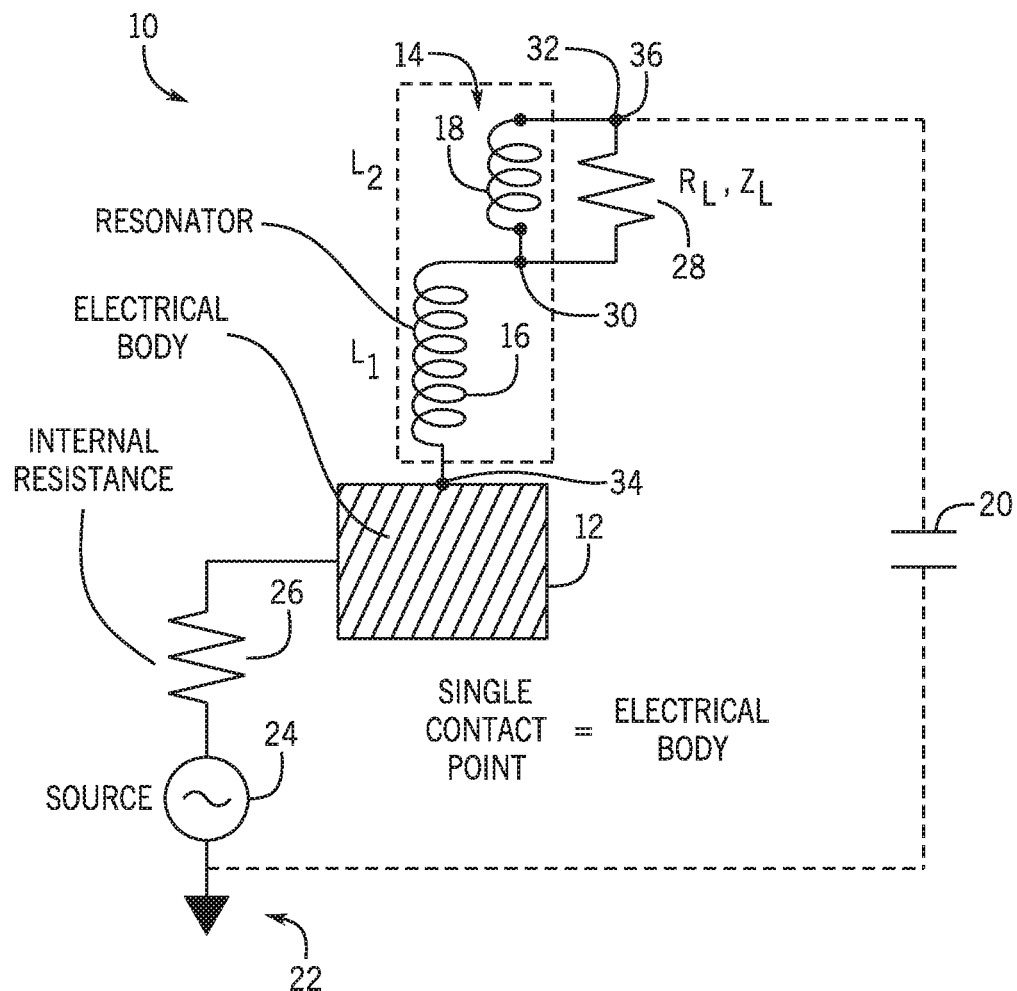
FIG. 1 is a schematic diagram showing a system in which a receiver is energized into resonance by contact with an object not in resonance.

As shown in FIG. 1, a system 10 is provided in which a conductive object 12 is energized with a changing electric voltage and a receiver 14 receives energy from the conductive object. The use of the term "conductive" here implies that the object allows the flow of electricity and that a voltage applied to one part of the object results in another part of the body receiving a usable voltage. The term "conductive" can include materials such as skin and soil where they have sufficient conductivity for the purposes described here and does not exclude the possibility that, for example, the object may have a dielectric coating. Typically, the changing electric voltage has a frequency and the conductive object is sufficiently small that given the frequency the phase differences from one part of the part of the object to another will be small, and the conductive object is not in resonance and has no standing wave when the receiver is not connected. In the case of a larger object or a smaller frequency a standing wave may occur on the object; this case will be described in more detail below.

The receiver may be placed into electrical connection to the object with a direct conductive connection or capacitively through a dielectric separating the receiver from the object or a conductive portion of the object 12. The electrical connection between the receiver and the object may be a movable connection over at least a portion of the object, for example a slidable connection, rollable connection or a connection via one or more movable legs. The receiver may be at least intermittently in electrical connection while in motion over the at least a portion of the object. The receiver has an inductance, shown in FIG. 1 as a first portion 16 and a second portion 18, and a capacitance 20. The capacitance as shown is a stray capacitance, which occurs between an unshielded object and ground. The inductance may be provided using a coil, but even a straight wire provides some inductance. A lower inductance, all else being equal, implies a higher resonant frequency and a lower ratio of voltage to current. A lower capacitance, all else being equal, implies a higher resonant frequency and a higher ratio of voltage to current. An explicit connection using a capacitor could also be used, but is not necessary. Ground 22 as shown in FIG. 1 can be floating or earthed. The inductance and capacitance of the receiver allow the receiver, when connected to a conductive object, to resonate at a frequency which depends on the inductance and capacitance and on a load of a device which may be connected to the receiver as described below, as the load participates in the resonance of the receiver. If the frequency of resonance approximately matches a frequency of the changing electric voltage of the conductive object, the receiver can be excited into resonance by electrical connection to the object. A sufficient degree of resonance can generate a much larger voltage within the receiver than the voltage of the object.

A source 24 is provided to generate a changing electric voltage on the conductive object. The source may have an internal resistance (or more generally an impedance) 26 which will result in the voltage of the object not matching the ideal voltage output of the source. The conductive object may also have a resistance. The effect on voltage of the impedance of the source will depend on the current through the source which will depend on the resonance of the receiver when the receiver is connected to the object. The source may have an associated measurement system (not shown) that will measure the current and/or power output for tuning the frequency of the source to match the resonance of the receiver. For example, in a system with multiple receivers with different resonant frequencies, the source could provide voltage at many frequencies sequentially or simultaneously and measure the resulting current to find the resonant frequencies of the different receivers.

Figure 2:
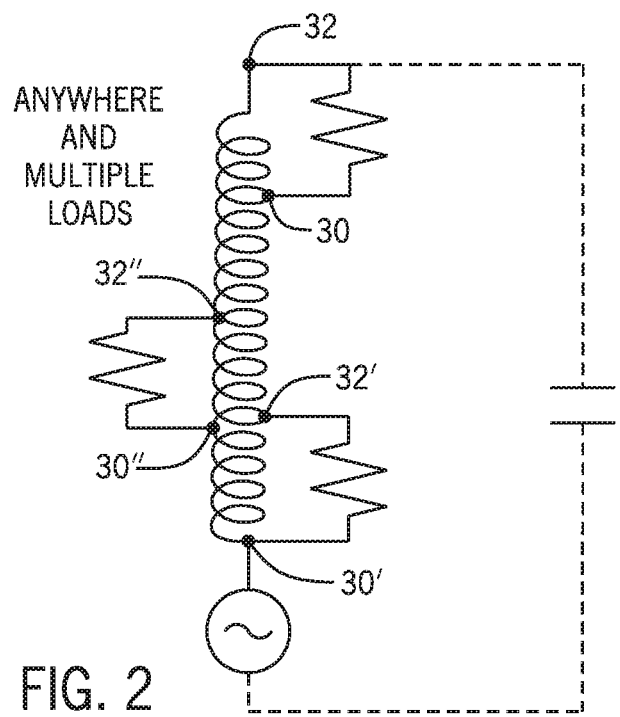
FIG. 2 is a circuit diagram showing alternative ways to connect a load to an inductor in a circuit approximately corresponding to the system of FIG. 1.
Figure 8:
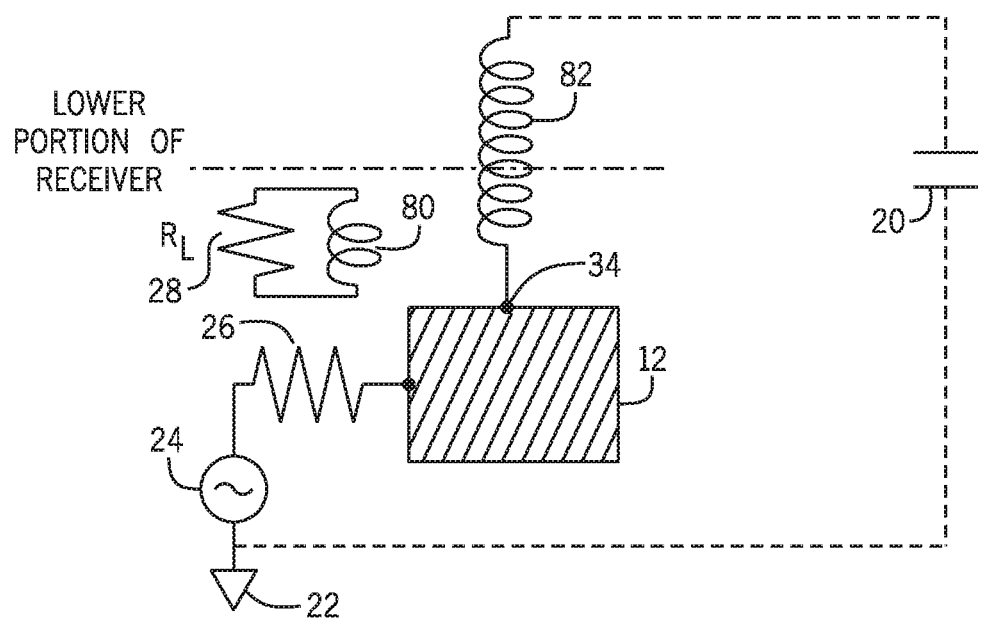
FIG. 8 is a diagram showing a system in which a receiver couples to a magnetic coupling element to supply power to a load.

The receiver in FIG. 1 also has a connection for connecting to a device for powering the device using the resonance of the receiver, represented in FIG. 1 as load impedance 28. This load can be resistive, but can also be capacitive (for example in oil sands heating) or inductive. As shown in FIG. 1, the connection for a connecting to a device comprises a first electrical junction 30 and second electrical junction 32 for connecting the device between the first and second junctions, at least a portion of the inductance of the receiver (here second portion 18 of the inductance) being disposed between the first and second electrical junctions, placing the portion of the inductance in parallel with the load of the device. The energy transfer to the load has been found to be most efficient when at the frequency of the resonance of the receiver the impedance of the portion of the inductance disposed between the first electrical junction and the second electrical junction approximately matches an impedance of the load provided by the device when the device is connected between the first and second junctions. The circuit comprising second portion 18 of the inductance and load impedance 28 may have an optional capacitor/inductor placed in series or parallel. As shown in FIG. 1, the receiver has a first end 34 configured to be placed into electrical connection to the object and a second end 36; in FIG. 1 the first junction 30 is located at a position intermediate the first end and the second end of the receiver and the second junction is located at the second end of the receiver. Other configurations are possible as shown in FIG. 2; for example as shown in FIG. 2 the first junction 30' can be located at the first end of the receiver and the second junction 32' can be located at a position intermediate the first end and a second end of the receiver, or the first junction 30" and the second junction 32" can each be located intermediate the first end and a second end of the receiver. Also as shown in FIG. 2, multiple loads can be connected simultaneously. Other possibilities for extracting energy from the resonance include placing the load in parallel with the whole inductance of the receiver, which is preferred for especially high resistance loads or placing the load in series with the inductance of the receiver, which is preferred for some loads, such as LEDs. The load may itself include an inductance, in this embodiment and others. The load could be placed in series with the inductance of the receiver at either end of the receiver or between two portions of the inductance of the receiver; placing it towards the first end will result in exposing the load to higher current and lower voltage, and placing it towards the second end will result in exposing the load to lower current and higher voltage. The receiver can also be connected to the load using a magnetic or electrostatic coupling. An electrostatic coupling can be, for example, a capacitive element located near the second end of the receiver. A magnetic coupling maybe especially useful when connecting electronics; for example magnetically coupling to the receiver with a pickup coil as a magnetic coupling element located near the first end. FIG. 8 shows a system using a magnetic coupling 80 disposed next to a receiver 14 to couple to a magnetic field from inductance 82 of receiver 14. In the embodiment shown the magnetic coupling is placed near first end 34 of receiver 14. The magnetic coupling is connected to load 28 to supply power to the load.

Figure 2A:
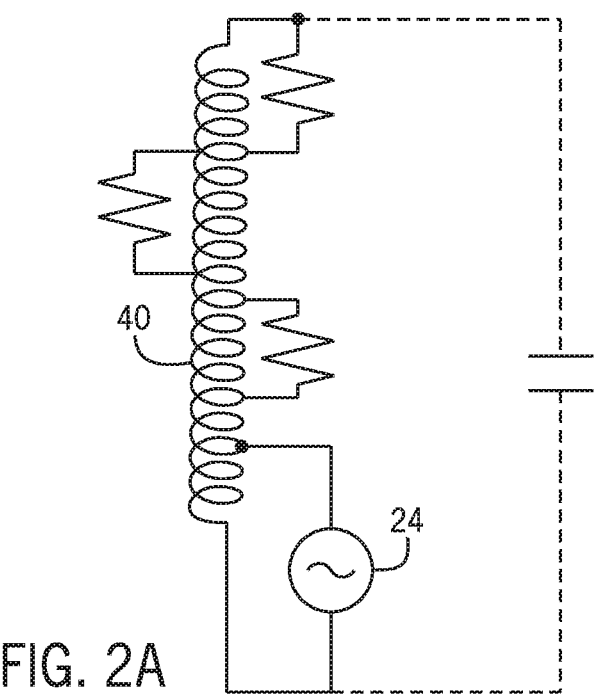
FIG. 2A is a circuit diagram showing alternative ways to connect a load to an inductor in a circuit in which a source connected across a part of the inductor.
Figure 3:
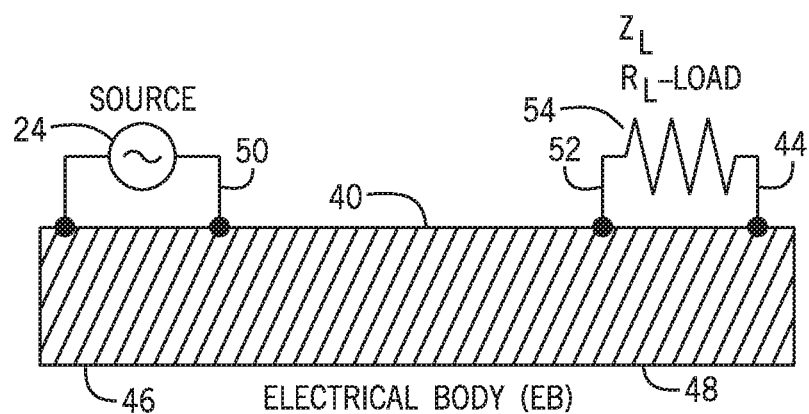
FIG. 3 is a schematic diagram showing a system in which an object is excited by a resonance by a source connected across a part of the object, and a receiver is connected to receive energy from the resonance of the object.

FIG. 2A shows an embodiment in which the source 24 energizes an inductance directly. This embodiment is not preferred for the case of energizing a receiver connected to a conductive object, though a receiver with two contact points connecting to differently energized strips could be energized in this way. This approach is more suitable when the inductance shown is not from the receiver but a conductive object 40 to be energized, as shown in FIG. 3. FIG. 3 shows a conductive object 40 (see above for definition of conductive) energized by a source 24 and powering a receiver 44. Source 24 supplies electrical energy to a first portion 46 of object 40. Object 40 has a self-inductance and stray capacitance which are excited into resonance by source 24. The resonance includes a changing electrical current or voltage at a second portion 48 of the object. Receiver 44 is connected to a location at the second portion and obtains electrical energy from the resonance. The conductive object may have an accumulative spatial distribution of self-inductance and stray capacitance. The resonance may depend on the accumulative spatial distribution of self-inductance and accumulative spatial distribution of stray capacitance and produce a standing wave around at least the second portion of the object. The conductive object may be as big or bigger than a wavelength of the standing waves, but the object may also support a half wavelength, quarter wavelength or 3-quarter wavelength standing wave. In the specific embodiment shown in FIG. 3, electrical energy is supplied to the first portion of the conductive object by connecting the first portion of the conductive object into a circuit 50 supplying a changing electrical current through the first portion of the conductive object. Also in the specific embodiment shown, the receiver comprises a pair of connectors 52 to connect a device represented by resistive load 54 to a pair of locations on the object to receive energy directly from the object. The load can of course have other characteristics than a resistive load.

Figure 4:
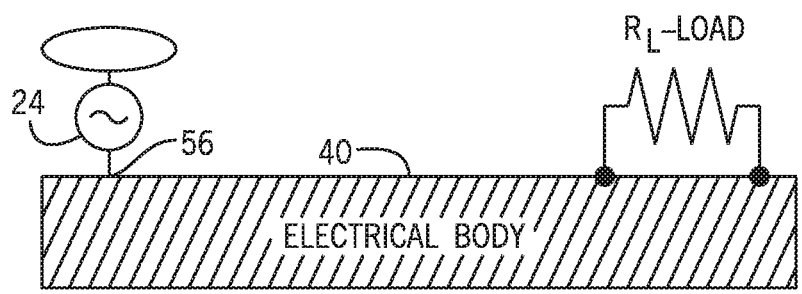
FIG. 4 is a schematic diagram showing an alternative version of the system of FIG. 3 in which a single electrical connection 56 to the source 24 is used to energize the object instead of connecting the object into a circuit.

FIG. 4 shows another embodiment where a single electrical connection 56 to the source 24 is used to energize the object instead of connecting the object into a circuit.

Figure 5:
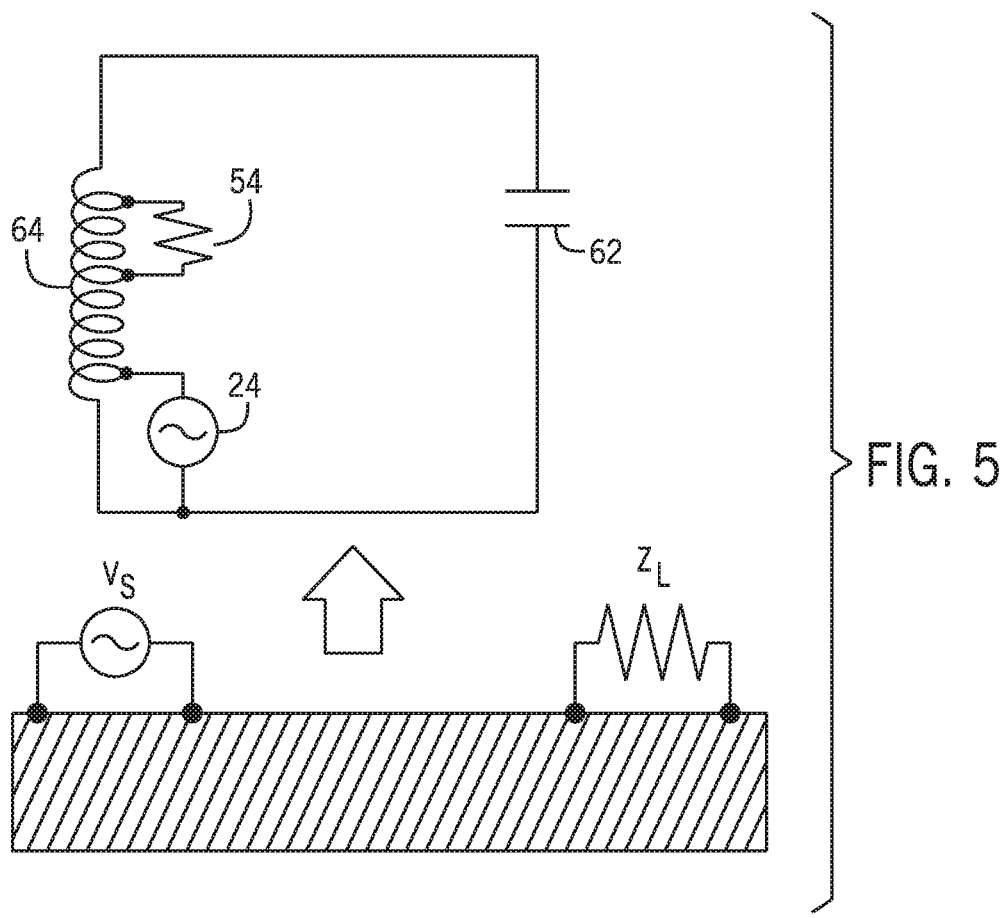
FIG. 5 is a circuit representation of the system of FIG. 3.

FIG. 5 shows the embodiment of FIG. 3 represented as a circuit completed by the stray capacitance 62 of the object and showing the self-inductance 64 of the object. This is a resonant circuit with an inductor and capacitor, also known as a tank circuit.

Figure 6:
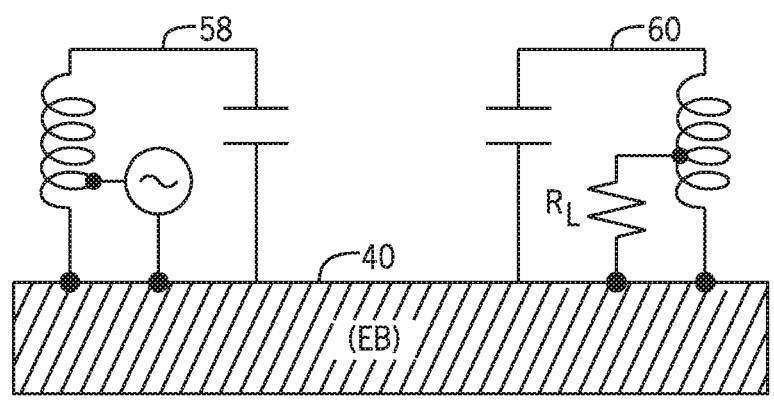
FIG. 6 is a diagram showing an alternative version of the system of FIG. 3 in which the source energizes a resonant circuit to energize the object and the receiver comprises a resonant circuit to be put into resonance from the received electrical energy.
Figure 7:
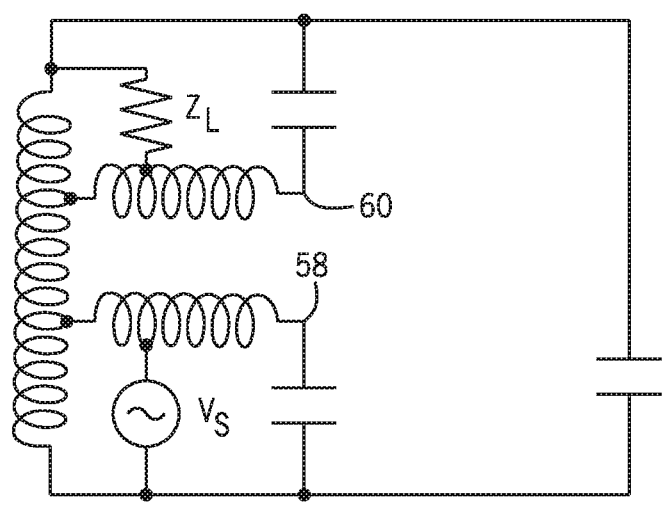
FIG. 7 is a circuit representation of the system of FIG. 6, except that the resonant circuits of the source and receiver are oriented in the reverse manner.

FIG. 6 shows an embodiment where the source energizes a resonant circuit 58 to energize the object and the receiver comprises a resonant circuit 60 to be put into resonance from the received electrical energy. These features can be used separately and do not have to be used in combination, but if used in combination and tuned to the same frequency, they may allow the source to energize the receiver even if the object itself is not in resonance. FIG. 7 shows the embodiment of FIG. 6 represented as a circuit completed by the stray capacitance of the object, except that in FIG. 7, the resonant circuits of the source and receiver are oriented in the reverse manner compared with how they are oriented in FIG. 6.

In one embodiment of this invention, a standing wave is generated on the length of an electrical body. An electrical body is defined as any state of matter that allows the propagation of electrical energy of any magnitude. An electrical standing wave by definition will exhibit one or more potential gradients starting at or near zero and increasing to some maximum in a non-linear fashion. Depending on the frequency, there may be multiple minimums and maximums along the length of the electrical body. By connecting a load between a location of maximum and minimum potential, a current will flow and power will be delivered to the load.

In way of an example, let the electrical body be a wire of approximately 7 meters in length. If an n-quarter (n being any odd integer) wavelength standing wave is placed upon this wire, a voltage maximum will be located at the end of the wire while a voltage minimum (or node) is located at the common terminal of the power supply. If the voltage at the end of the wire is measured to be 50 Volts, then the potential distribution along the 7 meter wire will be approximately 50 multiplied by the sine of the angular distance along the wire starting from an angle of zero at the power supply common and increasing to 90 degrees at the end. If one terminal of a load is attached to the end of the wire while the other terminal is attached to 3 meters below the end, a potential of 11 Volts will be applied to the load. A proportional current will then flow in the small loop at the end of the wire consisting of the load and 3 meters of wire. Thus, electrical power may be transmitted through a single electrical body to a load independent of any adjacent capacitively coupled or directly connected return path.

Certain interesting phenomena associated with this propagation mode may be observed. The operation of the load typically reduces the quality factor of the standing wave resonance—broadening the bandwidth. The input voltage and input current to the electrical body will be in phase while the voltage and current across the load (being in phase with each other for a resistive load) operates with a phase of 90 degrees from the input voltage/current. In the absence of any additional capacitance at the end of the electrical body, the standing wave resonant frequency may be about 2 times higher than the calculated value using the following well known equation for an nth odd standing wave:

$$f = \frac{4c}{n \cdot l} \qquad (1)$$

where f is the frequency, c is the speed of light, n is harmonic (fundamental being n=1), and l is the wire length. The multiplication of 4 by c is due to odd harmonic standing waves being a quarter of the wavelength and multiples of a quarter. For this standing wave mode, equation 1 must be changed to the following $$f = x \frac{4c}{n \cdot l} \qquad (2)$$

where x is a multiplication factor that may range from approximately zero to 2, based on the design of the receiver and surrounding medium. In practice x rarely goes below 1.

Figure 9:
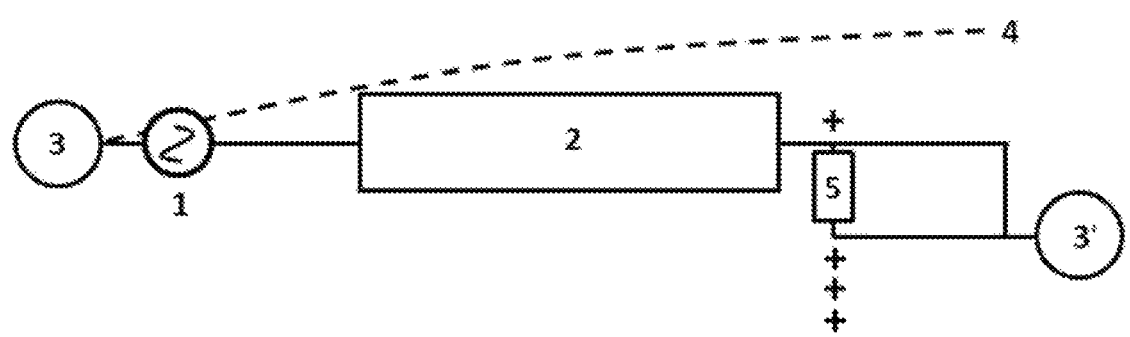
FIG. 9 is a schematic diagram showing an alternating source capacitively coupled to an object to generate an odd standing wave on the object.
Figure 10:
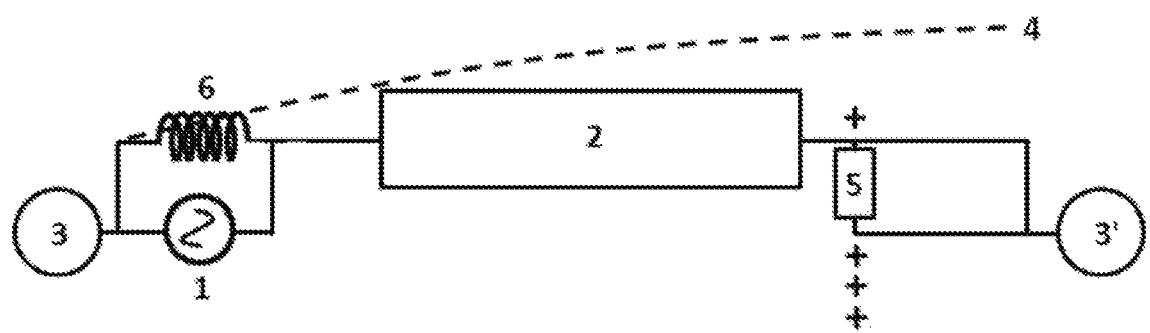
FIG. 10 is a schematic diagram showing an alternating source directly coupled to an object to generate an odd standing wave on the object.

In one embodiment, shown in FIG. 9 and FIG. 10, an alternating source 1 is connected between an electrical body 2 and a reference point 3 and this connection may be capacitively coupled or a direct connection with some amount of inductance. Electrical body 2 is connected between the source 1 and a reference point 3' and this connection may be capacitively coupled as shown in FIG. 9 or a direct connection with some amount of inductance as shown in FIG. 10. Electrical body 2 may be any state of matter allowing the propagation of electrical energy of any value. Examples of electrical body 2 may include but are not limited to, a wire, earth, planet, living entity, etc. Reference point 3 and 3' may be any state of matter allowing the propagation of electrical energy and serving as individual electrical reference points. Examples of reference point 3 and 3' may be but not limited to, the earth, a planet, a conducting sphere, a conducting plate, human beings, vegetation, etc. Alternating source 1 is set to a frequency that produces electrical standing waves 4 along electrical body 2. Based on the difference of physical and electrical parameters between reference point 3 and 3', electrical standing waves 4 will be even or odd octaves or harmonics—for illustration purposes only, the fundamental odd standing wave resonant mode of a quarter wavelength is shown in the figure—to obtain this condition reference point 3 must have greatly more self-capacitance than reference point 3'. It is understood that the standing wave may be a fundamental or any integer of harmonics and octaves from 1 to infinity. A load 5 is connected at one terminal to the end of electrical body 2 and at the other terminal to a location of lower electrical potential along electrical body 2. Load 5 may be 1 or more loads placed in standard electrical arrangements known to those skilled in the art. The connection of load 5 may be in any manner known to those skilled in the art. Such connections may include but not limited to direct connection, capacitive connection, and inductive connection. An inductive connection of load 5 would require a transformer connection placed in the position of load 5 shown in the figure. Source 1 may also energize an inductance 6 connected to electrical body 2.

Figure 11:
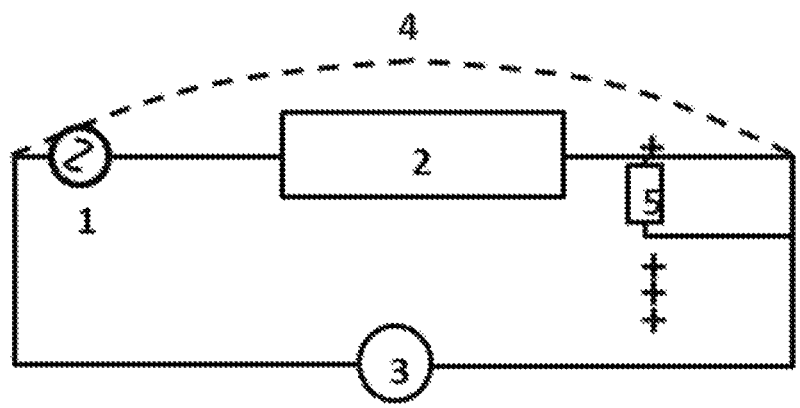
FIG. 11 is a schematic diagram showing an alternating source capacitively coupled to an object to generate an even standing wave on the object.
Figure 12:
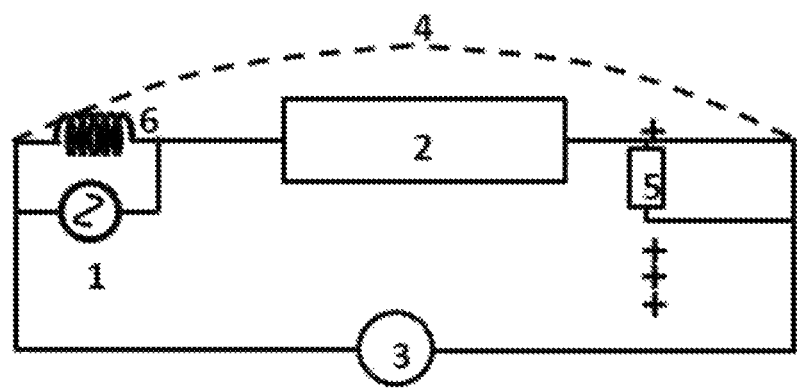
FIG. 12 is a schematic diagram showing an alternating source coupled to an object using an inductance to generate an even standing wave on the object.

In a second embodiment, shown in FIG. 11, the same arrangement as embodiment 1 is used except reference point 3 and 3' are connected together or otherwise the same. The standing wave propagated on electrical body 2 is composed of even octaves or harmonics if the electrical properties of reference point 3 permits—otherwise the standing wave 4 will be odd. Alternatively, source 1 may energize an inductance 6 as shown in FIG. 12.

Figure 13:
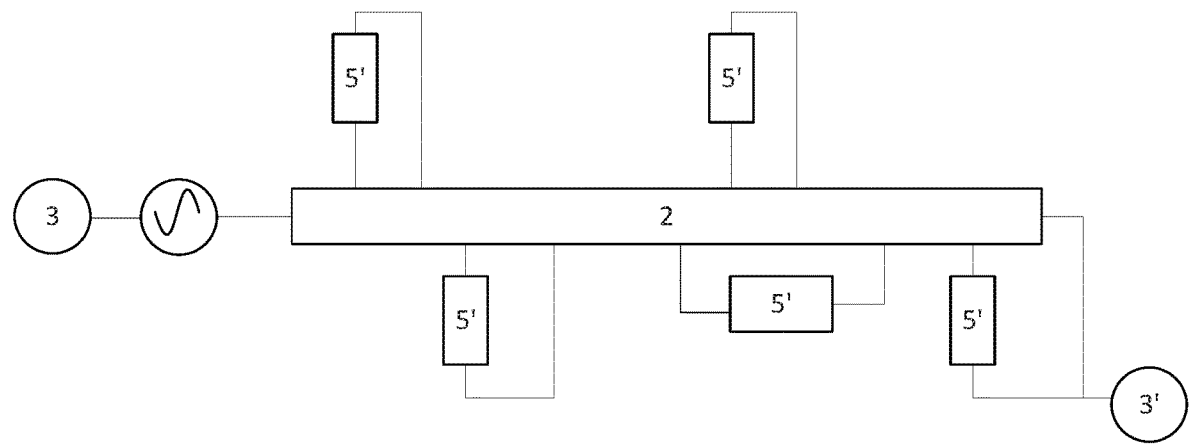
FIG. 13 is a schematic diagram showing multiple receivers connected to an object, with different reference points at each end of the object.
Figure 14:
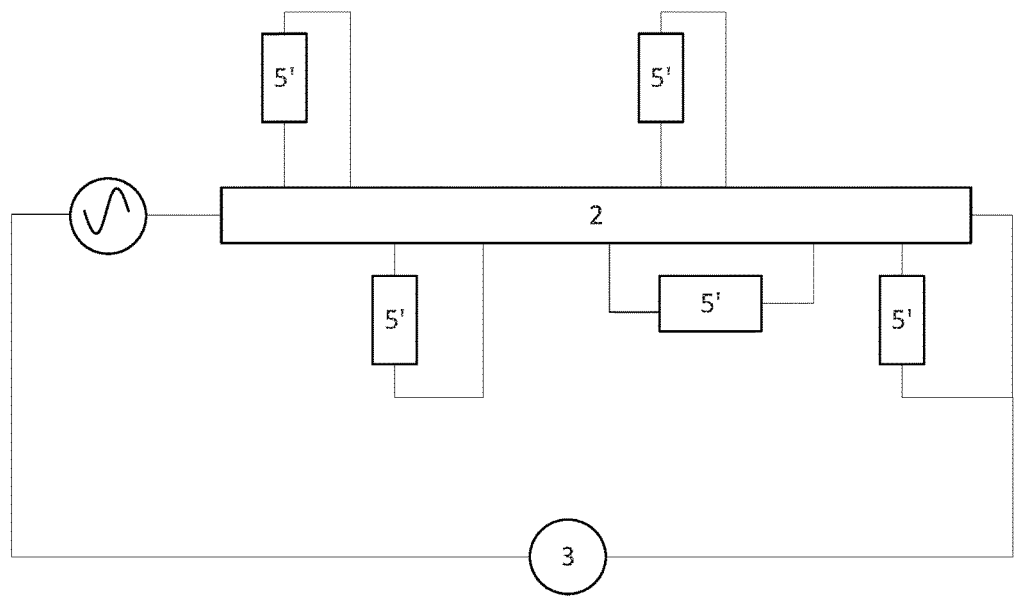
FIG. 14 is a schematic diagram showing multiple receivers connected to an object, with the same reference point at each end of the object.

In a third embodiment, as shown in FIG. 13 and FIG. 14, the same arrangement as embodiment 1 and 2 is used and additional loads 5' are added along the electrical body 2. The additional loads 5' may be 1 or more loads placed in standard electrical arrangements known to those skilled in the art. As the frequency of source 1 is changed, different standing wave modes will be placed along electrical body 2. Different standing wave modes will operate only certain additional loads 5' while others will not be powered. In this way power may be transmitted to select loads and not to others. FIG. 13 shows different reference points 3 and 3', suitable for odd standing waves, and FIG. 14 shows both ends linked to the same reference point, suitable for even standing waves.

Figure 15:
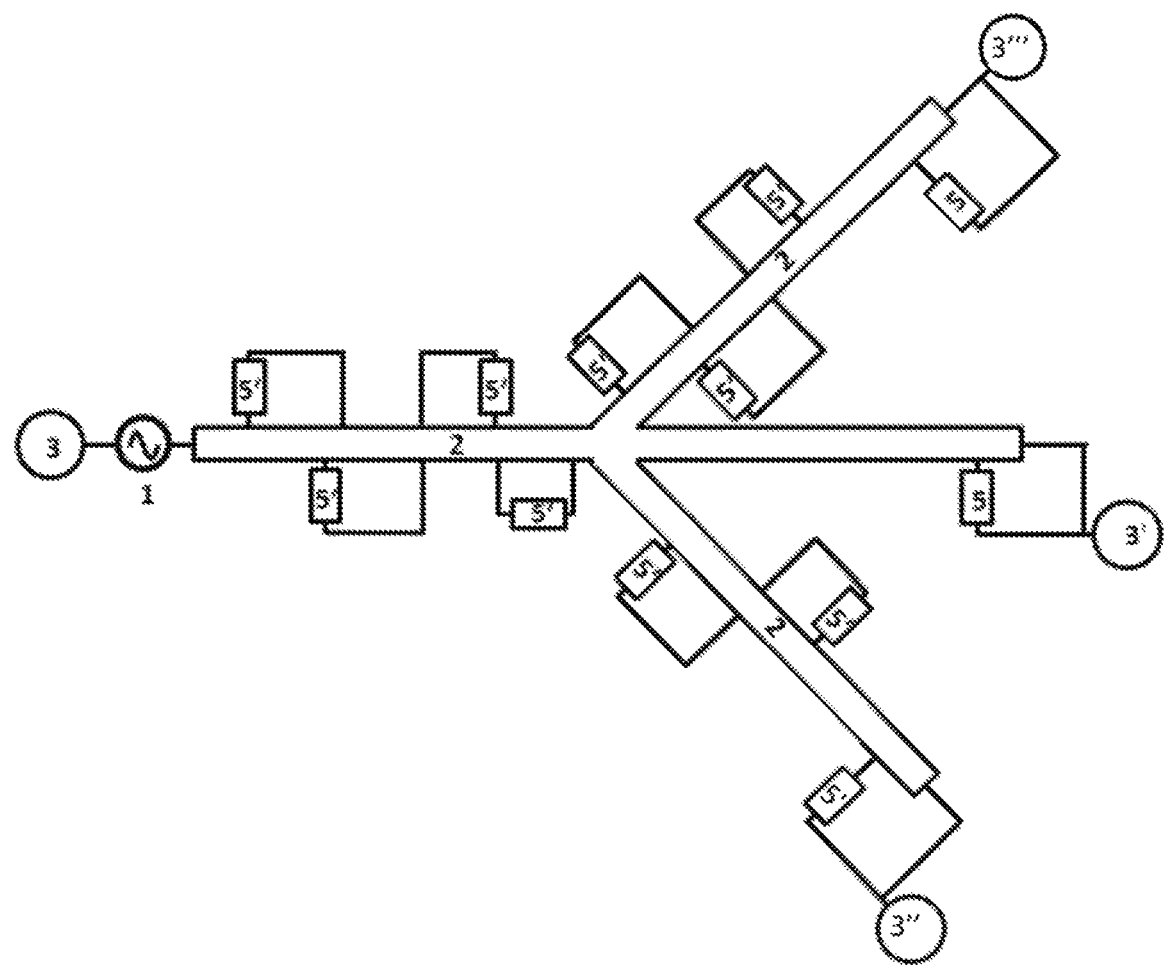
FIG. 15 is a schematic diagram showing multiple receivers connected to a branched object, with different reference points at the end of each branch of the object.

In a fourth embodiment, shown in FIG. 15, the same arrangement as embodiment 3 is used except electrical body 2 is split into branches 2' and 2". For illustration purposes only, the figure is shown with two branches but there may be many more. In addition, it will be obvious to those skilled in the art that the branches themselves may be also branched. Each branch will have a reference point 3', 3", and 3'". As in embodiment 2, reference points 3', 3", and 3'" may all be connected together or in various combinations with each other.

In a fifth embodiment, the same arrangement as embodiment 1, 2, 3, and 4 is used except that instead of delivering power, signals are sent to load 5 for purposes of communication and computing.

In a sixth embodiment, the same arrangement of embodiment 1, 2, 3, 4, and 5 is used except that electrical body 2 is a living entity. The living entity may be defined as any state of matter or force that is living or partially living and examples may include, but not limited to, a human, dog, cat, plant, insect, virus, etc. The physiological composition of each individual living entity may be different enough that even entities of the same type will possess a unique or individual propagation range of standing wave frequencies that will only propagate on one living entity and no other. The load 5 can then be connected in such a way as to require a combination of propagating standing waves to derive maximum power or to send encoded signals to a device. In this way load 5 may be only operated by a single living entity for purposes of security or medical treatment.

In a seventh embodiment, the same arrangement of embodiment 6 is used except the load 5 may be but not limited to a bacteria, virus, or cancer. Multiple sources 1 are connected to living entity 2 and phased in such a way as to produce focal points of electrical energy and at a combination of different frequencies to deliver electrical power to the biological load 5, killing the biological load 5.

In an eighth embodiment, the same arrangement as embodiments 1, 2, 3, 4, and 5 is used. Standing waves are incident on an electrical body or multiple electrical bodies. Interference wave patterns are used to create bits or otherwise an on or off (1 or 0) condition for use in digital signaling. The bit conditions may power a load 5 or multiple loads 5' to signal whether a bit is on or off, or otherwise the null or nodal point may be considered a bit of one condition while a region of greater potential difference is the opposite bit and may be detected in any way that is known or unknown in the art. Such systems may be described as digital photonic logic.

Embodiment numbers listed hereinafter do not refer to the numbered embodiments listed above.

Generally, a tank circuit is excited into resonance by applying an alternating voltage across the capacitive element at the resonant frequency of the tank circuit. To drive a self-capacitance, this voltage would be applied near or at a contact of the electrical body and oscillated at the electrical body's resonant frequency. The higher the magnitude of this applied voltage, the greater the resonant amplitude. On extremely large electrical bodies, such as planets, the voltage magnitudes required for resonance using self-capacitance excitation is extremely high, require hundreds of millions of volts.

An electrical body may also be excited by applying an alternating current through the inductance portion of the tank circuit. This current need not be applied through the entire inductance portion, but may be applied through only a small portion of the inductance. If the alternating cycle of the applied current matches the resonant frequency of the tank circuit, the entire tank circuit will be set into resonance even if the applied current only passes through a small section of the inductor. In the case of an electrical body possessing self-capacitance and self-inductance, a current applied through a small portion of the electrical body and at a cycle matching a resonant frequency of the body, will set the entire body into resonance. It has been found through experimentation that excitation through self-inductance is a much more efficient method of electrically resonating a body when compared to self-capacitance excitation.

In way of an example, it may be easily seen through experimentation that a tank circuit comprised of a single inductor and single capacitor may be set into resonance by applying an alternating current through only the straight wire connecting the capacitor and inductor together. Once in resonance, energy will be placed alternately between the inductor and capacitor of the tank circuit. If a receiver could be placed in the capacitor or on the inductor and tuned to the same resonant frequency as the tank circuit, this energy will be transmitted from the tank circuit to the receiver. Electrical power may therefore be transmitted without a return path since the transmission takes place through resonant coupling of the electric and magnetic forces—this power transfer will be maximum when in direct contact with the resonating electrical body (being the tank circuit in the example).

It is known in the art that many celestial objects, including the earth, act as an electrical body in a specific range of frequencies. The earth itself has a bandwidth starting at zero frequency (or direct current) and extends into tens of kilohertz. With proper grounding rods, the earth may therefore allow an electric current to flow through it. It is also well known but often overlooked in the art that the earth, being an electrical body, possess self-capacitance and self-inductance. The self-capacitance is formed by the surface (or terrasphere) in proximity to the atmosphere while the self-inductance is formed mainly from the terrasphere. It may therefore be concluded that the earth may function as a tank circuit. Such electrical similarities will also be shared among many other celestial bodies and pathways.

In one embodiment, a power source is connected to a non-radiating transmitter that is then connected to an electrical body. An electrical body may be defined as any object, or state of matter, that will allow the flow of current, regardless of the magnitude of that current. Examples of an electrical body may be, but not limited to, a wire, motor, generator, section of earth, section of a celestial body (moon, planet, sun, etc.), lamp, inductor, transformer, animal, plant, solar wind, etc. A non-radiating transmitter may be described as any device that produces resonating electrical oscillations where the vast majority of the input energy is stored within the device and not radiated into space. The non-radiating transmitter should produce electrical standing waves when in resonance; the standing waves being composed of voltage and current which are spatially and temporally 90 degrees opposite each other. The connection of the nonradiating transmitter to the electrical body should be in such a way that the current at the current standing wave anti-node of the non-radiating transmitter passes through a portion of the electrical body and this portion of the electrical body becomes part of the nonradiating transmitter. As energy is input into the non-radiating transmitter, the standing wave current will grow until equilibrium in the system is reached for a particular input. The current at the anti-node will then pass alternately through the portion of the electrical body. If the resonant frequency of the non-radiating transmitter is matched with a resonant frequency of the electrical body, then the entire electrical body will be set into resonance through the excitation of its self-inductance at the transmitter's current standing wave.

In the situation where the electrical body is the earth, a current passed through a small portion of the earth at a proper frequency will excite the entire earth into resonance. The earth then will act as a tank circuit and energy will be stored each cycle in its self-inductance and self-capacitance. A receiver placed near, on, or between the earth's terrasphere and atmosphere may collect this energy for electrical power. For optimum performance when using the earth or any other celestial bulk as the electrical body, the connections from the non-radiating transmitter to the electrical body should have a resistance as low as possible. An inductance cancelled resonant autotransformer (ICRA) may be used as the non-radiating transmitter with the power source ground and the ICRA ground being separated—thus the current standing wave passes through the ground portion where the ground portion is part of the electrical body. However, if a standard non-radiating transmitter must be employed, the transmitter must be split or else have the current standing wave located at the connections between the non-radiating transmitter and electrical body so that current may pass through the portion of the celestial body. The advantage of using a non-radiating transmitter over a standard tank circuit or generator is found the higher quality factor of the non-radiating transmitter as this will effect efficiency.

Figure 16:
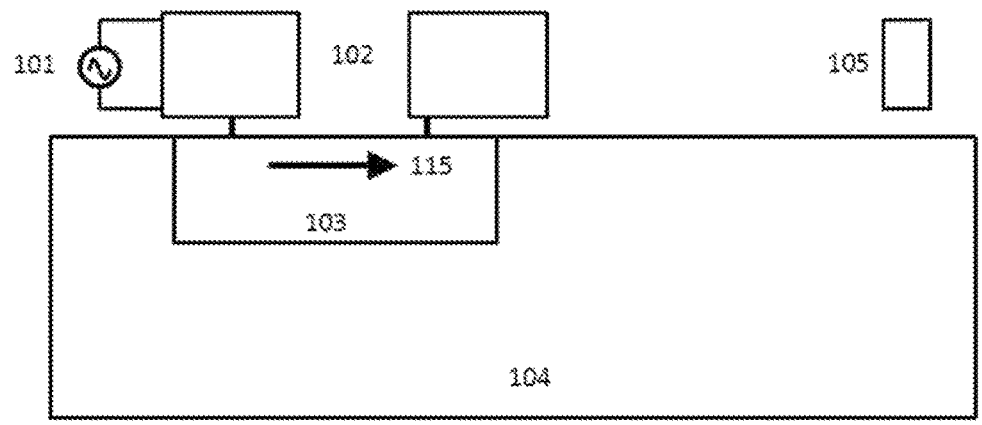
FIG. 16 is a schematic diagram showing an object energized using a non-radiating transmitter.

In a first embodiment, shown in FIG. 16, a power source 101 is connected to a non-radiating transmitter 102. The non-radiating transmitter 102 is connected to a portion 103 of an electrical body 104. The portion 103 acts as a continuation of non-radiating transmitter 102. Portion 103 is also placed within a region of non-radiating transmitter 102 where current flow 115 is maximum. Non-radiating transmitter 102 has a resonant frequency matching a resonant frequency of electrical body 104. The resonant frequencies of both non-radiating transmitter 102 and electrical body 104 may be fundamentals, overtones, harmonics, and subharmonics of each other. Current flow 115 passing through portion 103 of electrical body 104 will excite the self-inductance of electrical body 104 and set the entire electrical body 104 into resonance. Thus, electrical body 104 becomes an extension of non-radiating transmitter 102 regardless of electrical body 104's physical dimensions. An operating resonant frequency for non-radiating transmitter 102 and electrical body 104 should be chosen such that the electrical impedance of the resonating elements is greatly mismatched with free space. Otherwise, neither non-radiating transmitter 102 nor electrical body 4 will store energy and will instead broadcast it into space. A receiver 105 may then be placed anywhere along or some distance away from electrical body 104. Once receiver 105 is tuned to the same resonant frequency of electrical body 104, energy will be transferred to receiver 105 to power loads. It should be understood that multiple connections may be placed through portion 103 to direct the current in different directions as this will develop different resonant modes—some being better than others.

Figure 17:
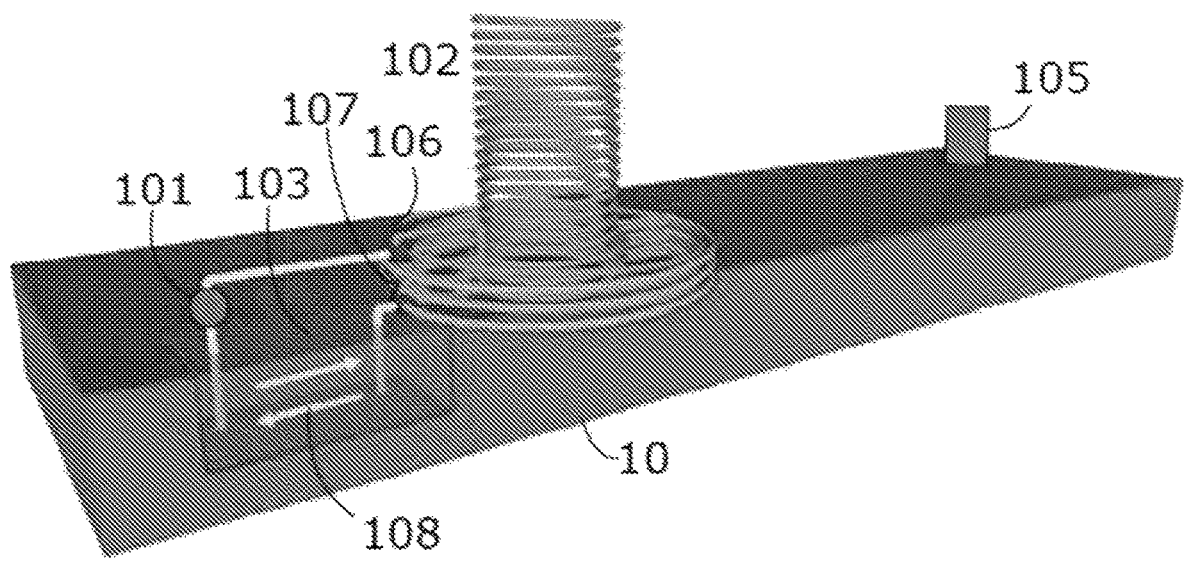
FIG. 17 is a schematic diagram showing the object of FIG. 16 in which the non-radiating transmitter is an inductance cancelled resonant autotransformer.

In a second embodiment, shown in FIG. 17, the same arrangement of embodiment 1 is used except non-radiating transmitter 102 is an inductance cancelled resonant autotransformer. Power source 101 is connected to one terminal of inductance cancelled resonant autotransformer 102 at junction 106 and to one terminal of portion 103 of electrical body 104. Junction 107 of inductance cancelled resonant autotransformer 102 is connected to a second terminal of portion 103 of electrical body 104. Thus, portion 103 is connected in series with the power source 101 and inductance cancelled resonant autotransformer 102. Junction 106 and junction 107 are located in the region of inductance cancelled resonant autotransformer 102's current standing wave. A large current 108 is then made to alternately pass through portion 103, portion 103 acting as part of inductance cancelled resonant autotransformer 102. Receiver 105 is then placed anywhere along electrical body 4 and when tuned to the same resonant frequency as electrical body 104, energy will be transferred between the two elements to power loads. It should be understood that multiple connections may be placed through portion 103 to direct the current in different directions as this will develop different resonant modes—some being better than others.

In a third embodiment, the same arrangement of embodiment 1 and 2 is used however the electrical body 104 is the earth and portion 103 is a portion of the earth. Portion 103 may be land, water, or both. The grounding rods used to connect portion 103 to non-radiating transmitter 102 and inductance cancelled resonant autotransformer 102 must be as low in electrical resistance as possible such that a large current may be applied through portion 103 with smallest amount of resistive losses.

In a fourth embodiment, the same arrangement as embodiment 1, 2, and 3 is used except the non-radiating transmitter is an electric machine. An electric machine may be but not limited to a generator, motor, etc. The electric machine should be made to generate reactive power such that the current placed in the portion 103 of the electric body 104 is reactive.

In a fifth embodiment the same arrangement as embodiment 1, 2, and 3 is used except the non-radiating transmitter is a tank circuit composed of a capacitance and an inductance.

In a sixth embodiment, the same arrangement as embodiment 1, 2, 3, 4 and 5 is used except portion 103 is connected in parallel to power source 101 and non-radiating transmitter 102.

In a seventh embodiment, the same arrangement as embodiment 1, 2, 3, 4, 5, and 6 is used and the operating resonant frequency of non-radiating transmitter 102 is at least two times higher or more than the resonant frequency of electrical body 104. Only half the cycle of current is passed through portion 103 while the other half cycle of current is passed outside of portion 103. Power source 1 is then modulated to produce an asymmetric wave shape in portion 103, the modulation matching the resonant frequency of electrical body 104.

Figure 18:
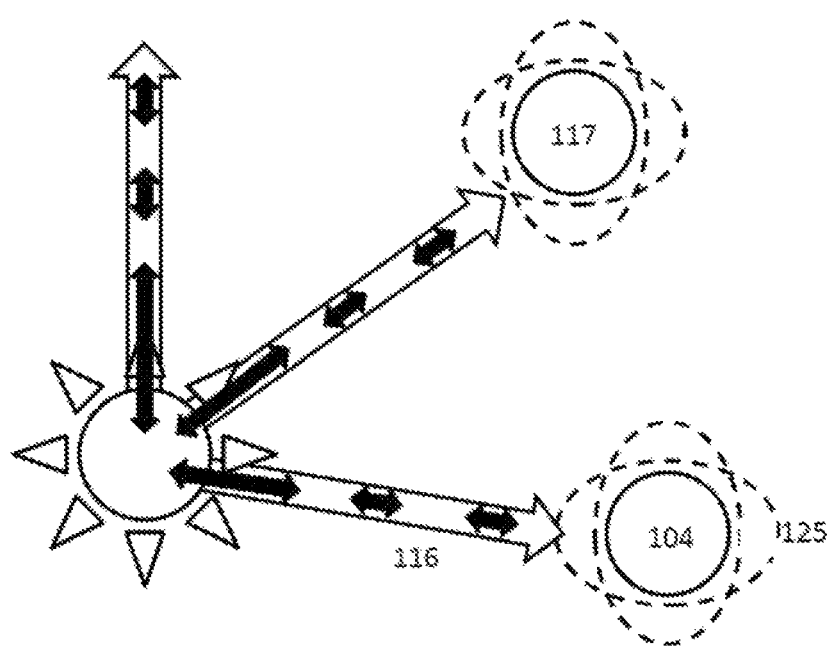
FIG. 18 is a schematic diagram showing a system for transferring power between celestial bodies.

In an eighth embodiment, shown in FIG. 18, the same arrangement as embodiment 1, 2, 3, 4, 6, and 7 is used however the resonance of electrical body 4 is modulated to produce periodic fluctuations 125. If the electrical body 104 is a celestial body (such as but not limited to a planet, planetoid, moon, asteroid, earth, etc.) being bombarded by charged cosmic particles such as a solar wind or cosmic current 116, then modulation of the electrical body 104 will induce a variation in the cosmic current 116 which will propagate through all paths traversed by the cosmic current 116. These pathways will be seen to those skilled in the art as being similar to a conducting wire made of plasma. In this way the pathways and interlinking celestial bodies 117 will become part of electrical body 104 and may then be used to transmit power or communication signals to receivers on one celestial body to another in an efficient manner.

In a ninth embodiment, the same arrangement as embodiment 7 is used except now the asymmetric modulation of electrical body 104 is itself modulated to produce periodic fluctuations 125 along electrical body 104. If the electrical body 4 is a celestial body (such as but not limited to a planet, planetoid, moon, asteroid, earth, etc.) being bombarded by charged cosmic particles such as a solar wind or cosmic current, then modulation of the electrical body 104 will induce a variation in the cosmic current 106 which will propagate through all paths traversed by the cosmic current 106. These pathways will be seen to those skilled in the art as being similar to a conducting wire made of plasma. In this way the pathways and interlinking celestial bodies 117 will become part of electrical body 104 and may then be used to transmit power or communication signals to receivers on one celestial body to another in an efficient manner.

In an tenth embodiment, the same embodiments as 1, 2, 3, 4, 5, 6, 7, 8, and 9 are used except multiple non-radiating transmitters 102 are used such that the electric and magnetic forces along electrical body 104 are super-imposed creating regions of higher intensity and lower intensity. These regions can then be physically moved by altering the phase and frequency between the multiple non-radiating transmitters 102. This will produce the ability to concentrate magnetic and electric forces in regions of interest for applications such as but not limited to metering, sensing, etc.

In a eleventh embodiment, the same embodiment as 10 is used except the concentrated magnetic and electric fields are made to coincide with a location along a celestial body (such as the earth) whereby modulation of that region causes a greater modulation change in the cosmic current that is bombarding the celestial body.

In a twelfth embodiment, the same embodiment as 10 is used except the concentrated electric and magnetic forces along electrical body 104 are made so strong that the concentration point causes ionization and electrical breakdown of the matter within the concentrated region. Through strong ionization and electrical breakdown, the concentration region is formed into an area of extreme heat where by objects entering into the region are incinerated. Such applications for this embodiment may be but not limited to chemical and material processing, security access restriction, defensive and offensive installations for prisons, bases, forts, bridges, etc.

In a thirteenth embodiment, the same embodiment as 12 is used except instead of incineration of objects entering the region, the energy is used to break down the layer of air between the atmosphere and celestial surface. If the celestial atmosphere has a DC or nearly-DC electrostatic charge, this stored charge may be brought down to the surface and stored in a capacitor. This capacitor may be connected in series with the non-radiating transmitter 102 or independent of any connection to non-radiating transmitter 102. The value of the capacitor should be large enough to appear as a very low reactance at the operating frequency of nonradiating transmitter 102. The capacitor may be connected to the surface or left floating.

Equation numbers referred to below here do not refer to equations above this point, and vice versa.

Here we focus on our own variation of the single wire transmission system where a metal acts as a single contact point for the connection of a receiver with attached load. An alternating, low voltage power signal is applied to the mat. Power is delivered to the load through the single contact with energy confined inside the wire by non-radiative resonant modes.

Figure 19:
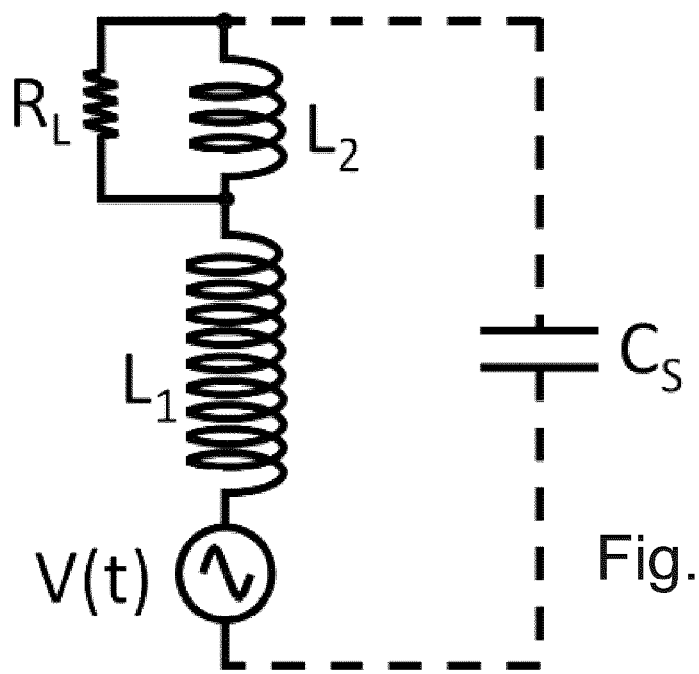
FIG. 19 shows a simplified electrical schematic of a circuit representing single contact power transmission.
Figure 20:
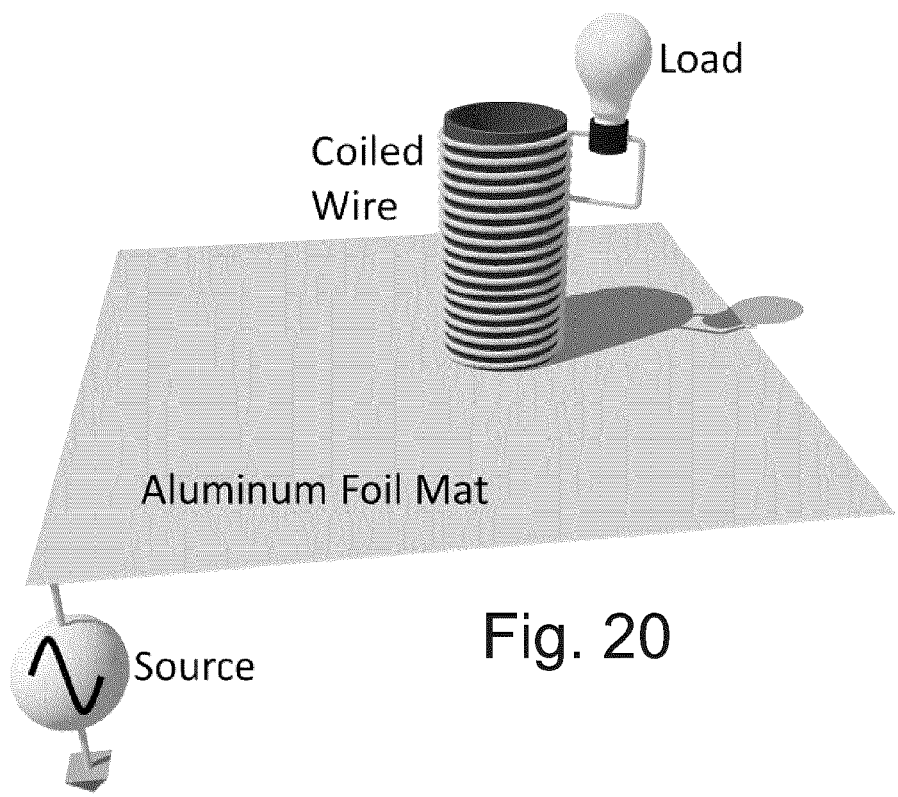
FIG. 20 shows an embodiment of the system of FIG. 1.

Single contact power transmission takes place when an electrical body is driven in resonance with self and stray capacitances. The only tangible portion of the system belongs to the inductance of the body—in most cases a wire, either straight or coiled—with the capacitance being non-tangible. Under this condition, the wire generally functions as a quarter wave resonator. Load placement becomes a critical parameter for optimum power transfer. The greatest utility is found when the load is connected in parallel with a portion of the wire's inductance $L_2$, as shown in FIG. 20 A. FIG. 19 shows a simplified electrical schematic of single contact power transmission. The self-capacitance $C_S$ is an intangible element. The source and internal wire resistances are not shown but may be lumped with $R_L$ into a total series resistance R. When the inductance of wire section $L_1$, load $R_L$, and self-capacitance $C_s$ is driven at resonance, the inductive reactance of the wire cancels that of the capacitance and permits charge flow through the load despite the lack of a conventional return. The behavior of the system may be approximated as a series RLC circuit when $L_2$ plays a minimum role in the determination of total system resonance and its internal resistance is neglected. Experimentally, this assumption appears valid under most operating conditions.

The behavior of a series RLC circuit is described by the classic differential equation for a harmonic oscillation in the displacement of an electric charge q, $$L\frac{d^2q}{dt^2} + R\frac{dq}{dt} + \frac{q}{C} = V(t), \tag{1}$$

where, for the resonance of interest, $L \approx L_1$ is the effective lumped inductance of the system, R is the effective lumped resistance, $C = C_s$ is lumped capacitance, and V(t) is the driving signal. The lumped resistance R is a combination of source resistance $R_S$, internal resistance of the wire $R_{W1}$, and load resistance $R_L$. The maximum amplitude of charge displacement occurs when the driving frequency ω is equal to the damped resonant frequency of the system, $\omega_d$:

$$\omega_d = L \frac{1}{\sqrt{LC}} \sqrt{1 - \frac{R^2 C}{2L}} = \omega_0 \sqrt{1 - 2\zeta^2}, \quad (2)$$

where $\zeta = R/2\sqrt{C/L}$ is the standard form of the damping ratio and $\omega_0 = 1/\sqrt{LC}$ is the natural resonance frequency. The energy stored in the system $E_{stor}(t)$ driven at $\omega_d$ can be expressed as $$E_{stor}(t) = \frac{LV_0^2}{2|Z|^2}\left[\sin^2(\omega_d t + \phi) + \frac{1}{1 - \frac{R^2 C}{2L}}\cos^2(\omega_d t + \phi)\right], \quad (3)$$

Here, $|Z| = \sqrt{R^2 + (\omega_d L - 1/\omega_d C)^2}$ is the series RLC impedance magnitude of the circuit and $\phi = \tan^{-1}(R/(\omega_d L - 1/\omega_d C))$ is the phase angle of the current relative to the source voltage. At resonance, equation 3 reduces to $$E_{stor}(t) = \frac{LV_0^2}{2R^2}, \quad (4)$$

where the phase angle between voltage and current is 90 degrees and energy dissipated in the system is strictly through the resistance R. The theoretical efficiency of the single contact transmission system is given by the time-averages (denoted by angle brackets) of the current-voltage products:

$$\eta = \frac{\langle i(t)v_L(t)\rangle}{\langle i(t)v(t)\rangle} = \frac{R_{Load}}{R_s + R_{wire} + R_{Load}}, \quad (5)$$

The efficiency is directly proportional to the internal resistance of the system. A low-impedance source utilized in tandem with a low-resistance wire will result in efficiencies approaching 100%. Practical implementations may exceed 80% efficiency with little effort; taking note that internal resistance is a function of operating frequency due to skin and proximity effects.

An experimental receiver was constructed from a wire coiled 210 times around an insulating polyvinyl chloride (PVC) frame whose top 20 turns were shunted with a load, as shown in FIG. 20. The one terminal of the power source is connected to an aluminum foil sheet with the other terminal left floating or grounded. An aluminum foil sheet, roughly 30 cm by 30 cm, formed the single contact point of the system. An alternating voltage source, capable of outputting 100 Watts at a maximum frequency of 13 MHz, was connected to the aluminum sheet through a single terminal. The bottom lead of the receiver was fastened to the PVC frame such that when resting upright made an electrical connection with the sheet. When tuned, the receiver could be placed haphazardly at any location on the sheet and the load would receive power independent of location. We also observed that by placing a dielectric between the sheet and receiver, the power transfer efficiency slightly improved with an overall increase in the system's resonant frequency. Although not shown accurately in FIG. 20, the receiver had 210 turns with the load shunted across the upper 20 windings. The coil could be placed anywhere on the aluminum foil mat and the load would receive power independent of location.

The load resistance was varied while measuring the input power of the system. The unloaded condition is set when $L_2$ is completely shorted as this eliminates capacitive effects that are found between leads if left open. The optimum power transfer to the load occurred when the load impedance was between 300 to 500 Ohms. The inductance of $L_2$ was measured to be ~30.4 μH. At the resonant frequency of the system, this section of the receiver had a calculated impedance of 458 Ohms, matching the optimum power transfer range. Detailed experimental analysis, beyond what is feasible to show here, has confirmed that maximum power transfer is delivered when the impedance of $L_2$ matches that of the load.

We calculated the efficiency of the system and plotted the damping response. A 25 Watt incandescent lightbulb (resistance equal to 600 Ohms at 60 Hz) was used as the load in this experiment. The light bulb luminance at the single contact operating frequency was calibrated to the luminance at 60 Hz using an optical power meter. The efficiency calculation formula is given by $$\eta = \frac{P_{NL} - P_{WL}}{P_{WL}} = \frac{R_{Load}}{R_s + R_{wire} + R_{Load}}, \quad (7)$$

where $P_{NL}$ is the power without load (measured at 4.74 Watts) and $P_{WL}$ is the power with load at full 60 Hz luminance (27.33 Watts). The subtraction of these values yields the power consumed by the load (22.59 Watts). The efficiency calculated was 83%. The damping response was determined by measuring the quarter wave electric field (E-field) maxima at the top of the coil from a distance of 25 cm. The unloaded resonant frequency of the system was approximately 2.4 MHz with a measured quality factor of 120. When the load was connected, both the quality factor (Q) and resonant frequency reduced to ~50 and 2.394 MHz respectively. This is a classic damped oscillator response. It can be seen that the E-field drops significantly when the load is placed on the system. The E-field values with and without load are small and well within regulated safety standards. In addition, the voltage applied to the aluminum mat was measured at 24.4$V_{RMS}$ (or 34.5$V_{peak}$) with a maximum current flow of 1.12$A_{RMS}$—within regulated standards for low voltage operation.

We have shown a non-conventional transmission system that operates on classic electrical engineering principles—if perhaps applied in a different way. The presented system is by no means optimized. The efficiency can be greatly increased with better materials and instrumentation. The system power levels are easily scalable. The receiver can take on many configurations from various coil geometries to tubes, cables, plates, etc. As briefly mentioned, a capacitive connection between the receiver and the single contact location allows for short-range wireless power applications. We have developed some unique applications in our laboratory, for example a cell phone charging application—in the embodiment mentioned power delivered to the cell phone is limited to 5 watts through a built in voltage regulator. The particular mat used in this embodiment has the ability to charge 8 cell phones simultaneously with no dependence on placement. We have also powered a 40 W lightbulb over an aluminum foil mat and using a metal cabinet as the single contact location. The bulb may be placed anywhere on the cabinet and receive power. We have also operated the presented system beyond 40 Watts.

The charging/powering of personal electronics is the most obvious application, but there are many more. With the rising cost of metals, this technology can more than halve the amount of copper required in homes, planes, and automobiles while reducing the wiring complexity at the same time. Wall outlets could be replaced with a metal sheet, encompassing a portion of the wall and completely paintable, transforming the entire wall portion into a single contact location. Moving electric vehicles could be charged by having inexpensive, single contact foil mats placed every so often along the road—without the need to demolish or redesign current roadway infrastructures. Possibly the biggest contribution this technology may have to offer is in the global transmission of power. With the ability to operate loads over larger single contact structures, it may be possible to one day use an entire terrestrial surface (such as the earth) as a single contact location. Such a feat would offer the transmission of electrical energy to any location worldwide by simply "connecting" to the ground.

Equation numbers referred to below here do not refer to equations above this point, and vice versa.

Figure 21:
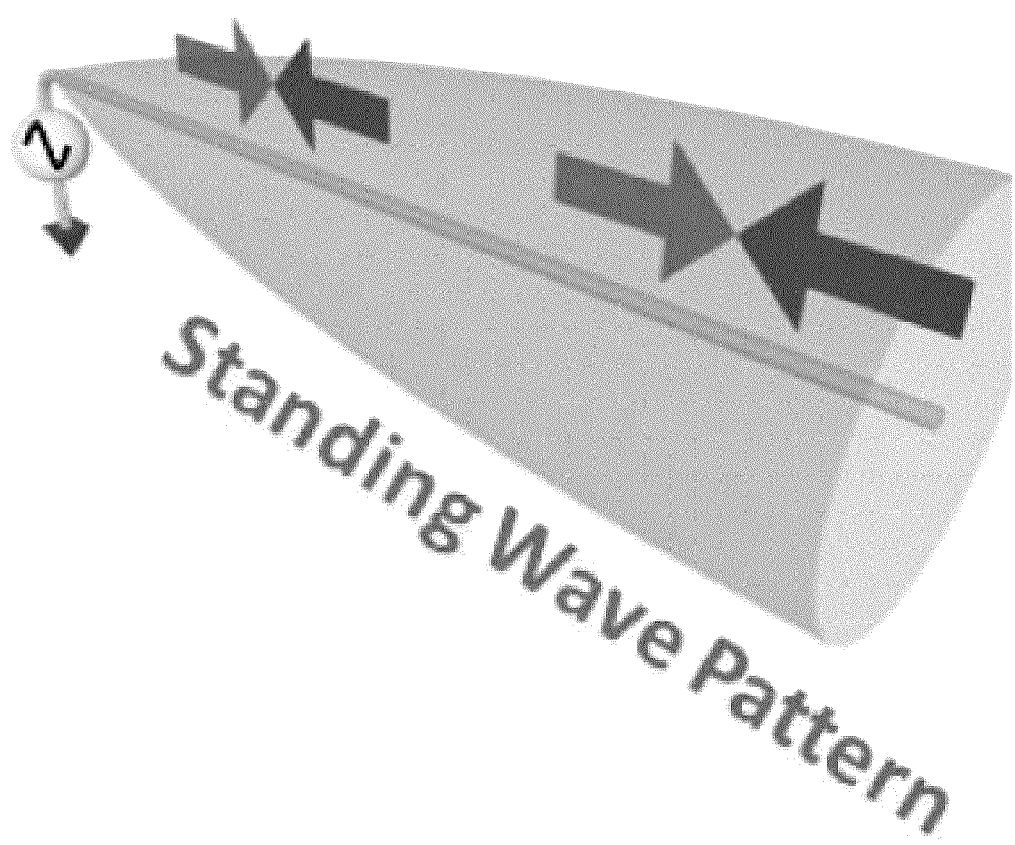
FIG. 21 shows an electrical standing wave pattern generated on a finite length wire connected to an alternating current source and resonant with the source.

Single contact power transmission takes place when an electrical body is driven in resonance with self and stray capacitances. The only tangible portion of the system belongs to the inductance of the body—in most cases a receiver made of wire, either straight or coiled—with the capacitance being non-tangible. The receiver is made to function as a quarter wave resonator; where the wire's electrical length is comparable to the applied frequency. A standing wave pattern as shown in FIG. 21 develops during resonance of the receiver. It should be noted that the standing wave pattern shown in FIG. 21 is that of the voltage standing wave and that the current standing wave would be the reverse, with the maxima occurring at the source. The electric field magnitudes along the wire may be expressed as $$V(d) = V_{SW}\cos\left(\frac{2\pi}{\lambda}d\right), \quad (1)$$

$$I(d) = I_{SW}\sin\left(\frac{2\pi}{\lambda}d\right), \quad (2)$$

where $V_{SW}$ and $I_{SW}$ are the standing wave voltage and current respectively, $\lambda$ is the wavelength, and d is the location along the coil measured as a function of the wavelength. For the wire to function as a quarter wave resonator, d is defined as zero at the wire's termination (or free end) and increases to $\lambda/4$ at the input. It can be seen that maximum voltage with zero current occurs at the wire's free end while the opposite resides at the base or input of the wire.

The single contact point is made to be non-resonant (i.e. electrically short) with an applied low voltage alternating current. By placement of the wire with attached load onto the single contact point, the resonant circuit is "completed" yet the contact point remains a location of low voltage due to the standing wave pattern. The increased voltage at the wire's free end may be easily insulated/shielded as needed.

In disclosed embodiments, there is a "contact point" or object which the resonator with load connects to. The object has a low voltage potential applied to it and the single wire (which acts almost like a receiver) gets put into resonance and delivers power through the object and that object remains at a low, safe potential.

The load can be in parallel with a portion of the wire's inductance or in series. Parallel is better because you can adjust for maximum power transfer if in parallel. If in series you are stuck with whatever you have and have to adjust the entire system's properties to get max power transfer—in parallel you adjust the tap so it is easier, but you can put it in series (even though its not optimum).

Parallel allows you to adjust things easier, but as far as how we operate the load as shown above, L2 is a small enough portion out of the total inductance that it plays a minimal roll in the standing wave properties. L2 makes up only ½0th of the total inductance of the resonator, this means that L1 is basically where all the standing wave currents and voltages occur. The standing wave voltage and current in L2 are almost negligible because of its position at the top. The majority of the energy delivered to L2 is through the magnetic field generated at the bottom of L1 (the system as we are submitting it in the paper is like a classic transformer with magnetic coupling, though the primary of the transformer is a quarter wave resonator). There are 2 ways that energy can be delivered to the load in our system. One is through the standing wave voltages and currents themselves and the other is through magnetic coupling between L1 and L2 like a classic transformer. The most optimum situation is when we use both: magnetic induction AND standing wave action.

In conventional transmission line theory and radio engineering, they teach you to make the impedance of the source equal to the impedance of the transmission line. The load is then placed in parallel with the capacitance of the transmission line. Effectively, you are taught to place a load at the termination point of the transmission line (in the circuit diagram you have, it would be putting the load in parallel with the capacitor or basically connecting a load from the top of the inductor to ground). If the load and transmission line have the same impedance, maximum energy will be delivered to the load and no standing wave effects will be created on the transmission line—you must have 2 physical wires in this case. In our method we do things completely different. We make our load part of the transmission line. We leave the transmission line completely open, which is effectively the same as attaching an infinite resistance in parallel with the capacitance. When you do this to a quarter wave transmission line (having infinite resistance in parallel with the capacitor), the input impedance (what the source would see if looking into the transmission line) does not look like infinity, instead it looks like zero ohms (in an ideal world). In reality it wouldn't be zero but it would be very very low, typically a few ohms or less. If we then match the impedance of our source to the impedance of our open transmission line, you will generate maximum standing waves in the system and the load (which is made to be part of that transmission line, either being in series or parallel) will have maximum power delivered to it. How you impedance match can be done several ways. You can insert a resistor, capacitor, or inductor between the source and the transmission line and adjust their value until it makes the source match the transmission line (assume the source was 1 ohm and the transmission line was 0.5 ohms, if you put the right value inductor, capacitor, resistor, or a combination of all 3 between the two, you will make the transmission line look as though it had 1 ohm and the two would match). The other thing you can do is change the frequency of the source until you get a standing wave resonance. You can adjust the source impedance by altering its internal guts. You can also do combinations of all 3. The idea here is that you're matching the impedance of the source to the open circuit transmission line impedance (which is always low) to maximize wave reflections instead of destroying reflections by matching the source to the characteristic impedance of the transmission line. The source is generally frequency tunable but you have to set it to the frequency that generates the most standing waves in the transmission line, then the frequency of the source and the transmission line will be the same.

Multiple loads can be connected to the same contact point. You can deliver power through several ways. The straight forward method is to have all the devices receiving the same frequency. So your phone is charging off of 1 MHz on a desk while mine is on the same desk and also charging at 1 MHz. In this case the source supplying the 1 MHz to the desk would see both loads simultaneously. Another way you can have different frequency voltage signals applied to the single contact point and each load will have a length of wire tuned to the individual frequencies applied. So my phone could be charging on a desk that operates off of 1 MHz while your phone is charging on the same desk but using 1.5 MHz. You could have either 2 different power signals applied to the desk so you get simultaneous power, OR you could have 1 source that is changing between 1 MHz and 1.5 MHz so that you deliver power one at a time (which could be advantageous from an engineering/cost perspective—less parts). You can also use multiple power signals to the same contact point and deliver it to a single load—which will allow you to deliver higher energy with a bare (non-insulated contact point). I mention this because as you start to increase the power with a single frequency, the voltage inherently will have to be increased on the single contact point. 25 W and below you can use a bare contact point (25 W is just on the edge). From what we've seen with the present system, going above 25 W you need to insulate the contact point. Even though the voltage is still low, the frequencies are high enough where an appreciable current will flow if you touch it and it causes a little RF burn on your fingers (nothing life threatening but annoying all the same). Putting a piece of plastic over the contact point completely stops this. By delivering multiple frequencies to the single contact point but at lower voltages, you can operate a single load over a bare contact point and exceed the 25 W limitation—if you didn't want to have to insulate the contact point, or maybe couldn't insulate it based on the situation.

The earth or any other terrestrial body with an atmosphere can be modeled as a distributed transmission line (DTL). Our recent experiments are even tending to show that the earth is a non-linear transmission line—though it would be difficult to say if other planets would work the same way (I would think they would). At any rate, the sky and ground form the capacitance of the DTL while the ground length wise forms the inductance. We have discovered another technique that utilizes driving the inductance (putting current length wise into the ground). This current can be either conductive (a real amperage like you see in your wall outlet) or displacement (such as the current that flows between two capacitor plates) but the key is that the current flows length wise in the ground and not between the sky and ground.

Terrestrial bodies tend to have very low fundamental frequencies however their quality factor is usually very low too which means they have a broad spectrum response. In regard to the earth, you can easily excite it up to 10's of kilohertz but past about 30 kHz it fizzles out. Also, driving it too low, below 2.8 Hz seems to fizzle it out as well. Connecting to the DTL requires not radiating but passing a current length wise between electrodes and establishing a resonant condition for optimum performance. As for the solar wind, it is a form of plasma and if you modulate the earth's sky (which you can do by modulation of the ground when connected to the earth's DTL) you should be able to send signals of at least 10's of kilohertz to neighboring planets—which would be enough for audio transmission and power. If anything you could send Morse code which would not require a low latency.

Incineration is a combination of voltage magnitudes (to create breakdown conditions between the DTL capacitance in a localized area) and the power required to sustain the breakdown. It requires little power to produce electrical breakdown—think of a static spark when you touch the door handle, very very little power is there—tazers themselves use low voltage batteries that are stepped up to high voltage. The power consumed is only what it takes to maintain the breakdown condition (like the tazer will use the power in the batteries to make the arc across the needles continuously spark but getting it to breakdown requires almost no power other than losses in the step-up electronics). The earth itself is already charged to 400 kV DC between the sky and ground due to solar winds and cosmic rays. Once you can cause a breakdown condition in a localized region, the charge on the earth could do the rest. This would usually require phase arraying or otherwise concentrating the ground/sky voltage in a given area to the point that it breaks down. To do this may not require much energy as the transmitters we are building can generate 2.1 MegaV in the ground with only 10 Watts of internal loss. This technique could be used to unlock atmospheric energy (effectively produce controlled lightning strikes in a location repeatedly on a clear day) or clear out vast regions of brush for farming/mining applications, etc.

GPS without satellites: If a transmitter is sending out signals through the earth's DTL you could create standing wave conditions over the planet and then detect when passing through nodal points to mark your location on the globe. You would need to create standing waves on both longitude and latitude though so you'd need a transmitter at the pole and one at the equator. You would want to operate at one of the upper frequency limits of the earth to get multiple nodal positions. As for power transmission to sky vessels, the earth's DTL is formed from both the sky and the ground, the inductance of both and the capacitance formed by both. If you connect to the DTL at the ground and put energy into the earth, that energy will get placed into the sky every half cycle and the electric field between the earth and ground will be increased over certain areas with time. A sky vessel could couple to the electric and magnetic fields between or in the sky (depending on its location). The fact that the air is insulating is why this would work. It would be like when someone lights a fluorescent tube wirelessly between two capacitor plates (I can demo this to you if you want), only in this situation the two capacitor plates are the sky and ground and instead of a tube you are powering an aircraft.

A standing wave is a form of distributed resonance. You can make an electrical resonator without standing wave effects, this is done by tuning the circuit to resonate at frequencies whose wavelengths are much longer than the size of the circuit. So as an example, I can take a 10 ft wire, coil it up and attach a capacitor in parallel to both ends of the coil. I can get this resonant circuit to oscillate at 10 kHz. The wavelength of 10 kHz would be about 90,000 ft. I only have 10 ft of wire so no standing waves would be produced and the circuit would be called "electrically short" and operate in a "lumped element" or "uniform current" regime—you need a wire length of about ⅒ the wavelength before standing waves effects start to take over and the system is considered "distributed." If I coiled up 20,000 ft of wire and attached a capacitor, I could get it to oscillate again at 10 kHz but I would notice standing wave effects on the wire. I could then remove the capacitor and use the self capacitance (also known as stray capacitance) of the coil to simply resonate it at 10 kHz. So long story short, a standing wave is a distributed circuit resonance which is different from a lumped element resonance.

The single contact point can be made a human body. A "receiver" (the single wire part) can be placed on the body and the "load" can be a cancer cell. You can deliver energy to the receiver through the body which puts energy into the cancer cell heating it and killing it. You can use multiple wires placed close to each other and crossing each other at various points with one wire in contact with a single contact body. The AC voltage to the body makes the signal travel through a certain path through the wires and creates a standing wave at the end of the wire. You close a switch with the single contact point at a different location and it changes the nodal points of the standing wave effectively altering the standing wave pattern—thus you have a high and low bit. You can cascade these and make digital logic with only a few electrical switches instead of requiring millions—as the bits show up as nodal/anti-nodal positions along the crossed wire system. For Theft security, we have observed that certain frequencies will propagate over some people and don't (or are weaker) on others. Here the human becomes the single contact point again and low level signals are applied, many of varying frequencies. A profile of frequency magnitudes are measured and recorded that will be unique for each person. This profile could be hardwired into a phone/device such that it will only turn on for that person when they pick it up and no one else—why steal a fancy phone if only 1 person in the world could ever turn it on)? On top of that, the mix of frequencies could also be used to power the phone so that the person wears a wrist band with battery (outside and not inside the phone) and the phone only derives power from that person. Even if someone stole their wrist band, they could not power the phone since the frequencies along their body would be different. It would be personalized battery power that would be integrated into the entire phone such that no one location on the phone would turn it on but multiple areas requiring many different frequencies—cracking a phone would be extremely difficult. Effectively you integrate the power over many different locations within the phone and over many different frequencies.

Equation numbers referred to below here do not refer to equations above this point, and vice versa.

To fill the void of large area, multi-load power transfer without the use of interconnected cables, we propose a technique based on single-wire no-return power transmission (SWNR). The concept of SWNR was originally developed by Nikola Tesla in the late 1800s. In Tesla's approach, loads were placed in various configurations along a resonant transformer which received power when the transformer was placed into resonance with its stray capacitance. Completing the circuit with stray capacitance effectively eliminates the need for a physical return cable. Tesla called this "transmission through one wire," and it formed the basis of many of his scientific endeavors. Since Tesla, few researchers have worked in this area. Nearly all subsequent demonstrations of SWNR transmission, or variations thereof, are qualitative and require high driving voltages, making power transfer to devices unsafe in the vicinity of people.

Here we present a low voltage variation of SWNR designed to operate over surfaces. Such surfaces may include any conductive object from a mat or nightstand to a cabinet or a conference table. The load in our system is not viewed as an external element, but as an integral part of the transmission line enabling efficient power transfer at resonance through internal dissipation. In brief, an alternating-current (AC) power signal is applied to a conductive surface. The connection of a helical receiver to the surface drives the receiver in resonance with its surrounding stray capacitance delivering power to a load attached to the receiver at any location on the surface. Only non-radiating resonant modes are excited, confining the energy within the system.

Figure 22:
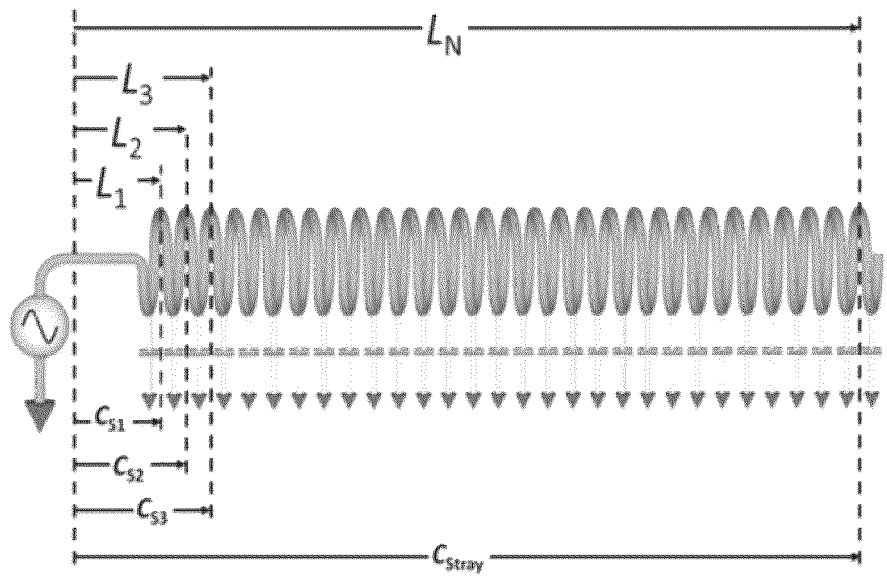
FIG. 22 shows a distributed circuit model of an embodiment corresponding to FIG. 20

The governing principle of our single-contact system is based on exciting an evanescent (standing wave) mode inside a slow-wave helical resonator where the input electric and magnetic field vectors undergo temporal and spatial phase transitions as a function of the geometry and aspect ratio of the winding. The receiver is constructed from a solitary wire that is coiled and operates as a special case of quarter-wave transmission line with an open circuit termination. At its resonating frequency, each turn of the helix is in self-resonance depending on the electrical parameters at that turn viz. the resistance, inductance, and capacitance distributed across the physical length of the helix. The distributed circuit model of the system can be represented as shown in FIG. 22. The circuit behaves similar to a series RLC resonator. However, unlike a lumped RLC resonator, the inductance and capacitance are cumulatively distributed causing changes in the quality of resonance at each turn. In a typical transmission line, the output electric field as a function of position d (fractional wavelength) is represented as, $$E_{out} = E_{in} e^{j(\gamma d + \omega t)} \quad (1)$$

where $\gamma$ is the propagation constant represented as $\gamma = \alpha + j\beta$, $\alpha$ being the attenuation factor and $\beta$ the phase constant; and $\omega$ is the angular frequency. The propagation constant can be looked upon as the Euler representation of the spatial phase relationship ($\varphi$) between the E and H field vectors at each point in the transmission line. However, the special case operation of our system makes $\beta$ a function of the position d which is not a constant along the line (helix); causing $\gamma$ to also become a function of the geometry and no longer a constant. This non-constant $\gamma$ may be redefined as a propagation factor which may or may not be a constant depending on the system's operational regime. Such a formulation accounts for the build-up of electric field at the termination end of the helix through the conservation of energy since $\alpha \to 0$ at the terminal end. Conventional transmission line theory considers $\beta$ as a constant. A careful analysis with the strictest condition of achieving perfect reflection at terminal end accounts for a magnitude of field amplification by a factor no greater than 2.5092 or 2 times the input (following wave reflections) considering the magnitude of the propagation constant. However, the build-up in our special case operation is governed by the resonance parameter distribution following, $$|E_i| = (|E_{i-1}| + E_0 e^{j(\alpha_i + j\beta_i)d_i}) \cdot e^{j\omega t}, \forall i = [1, N] \quad (2)$$

where, $$d_1 = \frac{\lambda_i}{N} = \frac{\pi}{2} \frac{1}{N\beta_i}$$

is the fractional quarter-wavelength perceived by the wave at the $i^{th}$ turn of the helix. $\lambda_i$ is the fractional wavelength traversed by the propagating wave at each $i^{th}$ turn and is a function of the geometry of the helix. The obtained voltage becomes a function of the helical length l per turn given by $$|V_{TER}| = \sum_{i=1}^{N} |E_i| \cdot i \cdot l \quad (3)$$

Following the generalized current-voltage phase relationship in an inductor, the current distribution at each turn becomes $$|I_i| = \frac{|V_i|}{\omega L_i}, \text{ where } L_i = L_{i-1} + (i \cdot L_{self}) \quad (4)$$

$L_i$ being the cumulatively distributed inductance along the line (helix) at the $i^{th}$ turn and $L_{self}$ being the self-inductance of each turn dependent on the core material, turn radius, and gauge of wire.

Simulation results based on observed phase shift and input current and voltages gives an estimated electric field, voltage, and current distribution in the helix as a function of physical turn number i. A more detailed discussion on the theoretical model and the distribution parameters is beyond the scope of this discussion and would be communicated shortly in an upcoming article. It should be noted that the amplified field at the termination end is a restricted field and minimally-radiative in accordance with slow-wave antenna theory. Following the distributed circuit model, the cumulative stray capacitance acts like a virtual load alternately storing energy between itself and the entire helical inductance at the resonance frequency. The voltage is maximum and the current is almost zero at the termination; while at the base, it is just the reverse. In addition to the spatial phase $\varphi_{TER}$, the temporal phase angle $\theta_{TER}$ between $V_{TER}$ and $I_{base}$ is also 90 degrees for an ideal system with zero radiation. For a real world system, the portion of the wave transmitted at the terminal end will reduce both the spatial and temporal phases ($\varphi_{TER}$ and $\theta_{TER}$ respectively). The output power of the receiver will thus be complex and mostly reactive when $\theta_{TER}$, is near 90 degrees. In contrast, a radiating antenna has an output that is mostly active with a zero degree phase, thus making β a constant (using small angle approximation). For our system, the complex output power $S_{TER}$ at the receiver's termination is $$S_{TER} = P_{TER} + jQ_{STORED} = I_{base}^2 \cdot R_{Rad} + jI_{base}^2 \cdot X \quad (5)$$

where $P_{TER}$ is the active power component leaving the system as electromagnetic radiation and is equal to the squared magnitude of the current at the base of the helix ($I_{base}$) multiplied by the radiation resistance $R_{ad}$; $Q_{STORED}$ is the reactive or stored energy in the receiver at resonance which represents the near-field component and is equal to the multiplication of $I_{base}^2$, with the reactance $$X = \text{either} \sum_{i=1}^{N} \omega L_i$$

or $1(\omega C_{STRAY})$ depending on the cycle). For a tightly wound helix close to the ground plane and small compared to the wavelength, the radiation resistance present in the system is very low. The active power portion of Eq. 5 can be related to the input of the base of the helix by, $$P_{OUT} = P_{IN} - P_{Diss} \quad (6)$$

where $P_{IN}$ is the total active input power delivered to the system, and $P_{Diss}$ is the power dissipated in internal losses (wire resistance, eddy currents, etc.) along the receiver. A real load connected to the system increases the total internal resistance ($R_{Diss}$) and functions almost identically to a series RLC oscillator circuit where the load is placed in series with the inductive element, in contrast to a conventional transmission line where the load is placed in parallel with the RLC capacitance. To a first order approximation, a lumped series RLC circuit can be successfully used to model input voltage, current, and frequency response at the source (though fails to accurately model these values at the load). A real load in our system may therefore be viewed as part of the transmission line instead of a separate component. If the source voltage is held at a constant value, the connection of the real load always acts to lower the input current. Raising the source voltage and bringing the current back to the initial unloaded value will deliver active power to the load. This method allows energy to be efficiently transferred from source to the load with only a single conductor as the power transport medium.

A conductive object may act as the feedline to the quarter-wave system, bridging the connection between the receiver and power source. If the object's dimensions are small compared to the operating wavelength, the applied voltage from the source will be roughly uniform over the entire surface area of the object. Placement of the receiver onto the object's surface allows the receiver to become energized while the object remains at a low voltage due to the nodal location in the standing wave pattern. The receiver's near-field thus becomes extended over the conducting object. Lower frequencies will enable power transmission over larger areas. As a hypothetical example, a cubic object having 15 m sides with an applied frequency of 1 MHz would still maintain a voltage nodal magnitude over the entire surface area. At the free end of the receiver, the standing wave pattern produces a voltage anti-node. This higher voltage may be easily insulated or shielded, leaving the whole system safe for human contact. It should be pointed out that with the system in resonance with stray capacitance, any intrusion (person) into the capacitive region detunes the system for a fixed driving frequency. This detuning will reduce the E-Field and power transmitted through the quarter wave resonator. Sufficiently isolated terminal fields will be small enough for safe human contact especially for low power applications. To mitigate this environmental sensitivity, frequency rastering or feedback mechanisms could be used to compensate for the changes in capacitance, thereby retuning the system to resonance and ensuring efficient power transfer. For high power applications, the detuning of the system may be left as a feature to improve operational safety.

A receiver was constructed from 22-gauge magnet wire tightly coiled 210 times around a black acrylonitrile butadiene styrene (ABS) pipe. The load was placed in parallel with the uppermost 6 turns of the coil. An aluminum foil sheet (25 cm by 25 cm) formed the single contact transmission surface for the coil. One output terminal of a high frequency power source was connected to the sheet (labeled source lead) while the other output terminal was electrically grounded. The receiver was fastened to the ABS frame such that when the receiver was resting upright, its bottom terminal made electrical contact with the sheet. The resonant nature of the system made direct measurements at the load difficult, as direct connections of standard equipment at the free end of the receiver drastically changed the operating conditions of the system. The least-invasive method found was to measure the voltage and current values at the output of the power amplifier (which is the input of the receiver). These values and their relative phase angles were recorded with a current probe and a standard 10× voltage probe. When the frequency of the power supply was tuned to match the standing wave resonant frequency of the receiver, the load would absorb power regardless of the receiver's position on the aluminum sheet. We observed that the insertion of a dielectric between the sheet and receiver increased the power capacity of the system as higher input voltages could be safely applied to the sheet. It should be noted that the capacitance formed between the bottom terminal and the sheet acts as an impedance and not an energy storage component. It is the stray capacitance responsible for the energy storage in the system related to $$\frac{1}{2} C_{STRAY} V_{TER}^2.$$

The insertion of the dielectric and the formation of a connecting capacitance allowed the system to function in a quasi-wireless state where a direct, bare-metal connection was not required. The effect of sheet insulation on the system was further investigated to determine the system's response.

Figure 23:
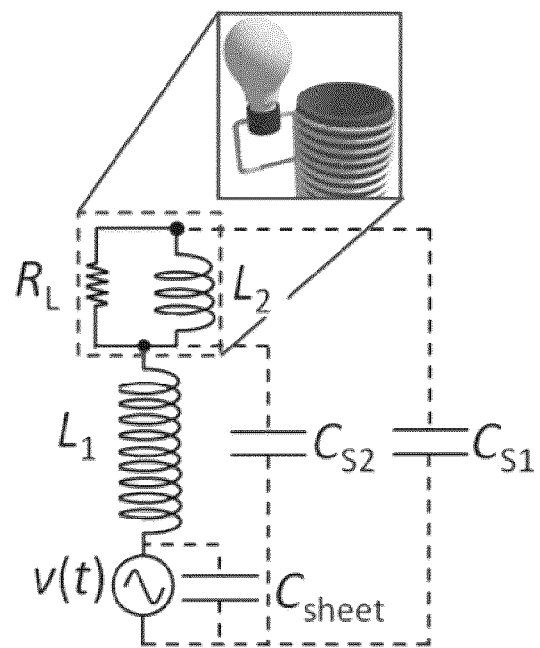
FIG. 23 is a schematic diagram of a system corresponding to FIG. 20, but with additional capacitances included as compared with what is shown in FIG. 1.

FIG. 23 shows the equivalent lumped circuit schematic of the single-contact system. The stray capacitances $C_{S1}$ and $C_{S2}$ are non-tangible elements. The aluminum sheet produces another stray capacitance ($C_{SHEET}$) that is shunted with the supply. Generally the reactance of $C_{SHEET}$ at the operating frequency is very large and can be neglected for small sheets sizes. Larger sheet sizes require compensation at the supply to negate the effects of $C_{SHEET}$ which increases the input current and consequently reduces efficiency. Using experimentally determined parameters, the system response was simulated for various loads. The simulated model predicted a maximum power transfer to the receiver when the load resistance approximately equaled the impedance magnitude of inductor $L_2$. To experimentally verify this, a potentiometer (rated for 0.5 W) was used as the load. We recorded the input power to the system with varying load resistances ranging from 0.7Ω to 3000Ω for both a bare and an insulated aluminum sheet. The input current from the source was maintained at 30 mA while the input voltage was allowed to fluctuate. This produced a typical Gaussian-shaped power curve. Maximum power transfer was obtained when the load resistance was between 90 and 190Ω for both the bare and insulated sheet. The inductance of $L_2$ was 5.887 pH. At the resonant frequency of the system, this section of coil had an estimated impedance of 97Ω. This result approximately matched the simulated power transfer curve of the model with peak transfer power nearly half of what was experimentally observed.

To demonstrate higher levels of power transmission, 25 watt incandescent light bulbs were used as loads. The amount of power dissipated in the loads was quantified by applying 60 Hz mains power (120 $V_{rms}$) to the light bulbs and measuring the input voltage and current with a digital multimeter. At the same time, the relative irradiance of the light bulbs was measured with an optical power meter at a distance of 30 cm. The light bulbs were then connected to the single-contact system without altering their distance from the optical power meter. The high-frequency alternating voltage was applied and increased until the reference irradiance was observed.

For the bare aluminum sheet, the total input power was 61 W with an attached 50 W load. The losses in the system are the summation of AC wire resistance, electromagnetic radiation, and eddy currents in the aluminum sheet. The wire resistance at 2.2 MHz was 5Ω, dissipating 0.9 W. The power dissipated in eddy current losses that are generated in the aluminum sheet at the base of the wire can be estimated by $$P_{Eddy} \approx \frac{\pi^2 d^2 f^2 B_{peak}^2}{16\rho} \cdot \Lambda \tag{7}$$

where d is the diameter of the helix, f is the operating frequency, $B_{peak}$ is the peak magnetic field in the receiver, $\rho$ is the resistivity (2.82×10$^{-8}$ Ωm for Al.), and $\Lambda$ is the volume of the aluminum sheet affected by the eddy currents. The wire at the base of the helix was wound 1.25 mm above the bottom of the ABS pipe. The estimated magnetic field at this distance from the sheet was determined to be approximately 85 μT. For 6 μm thick aluminum foil, the volume affected by the eddy currents was 3.6×10$^{-9}$ m$^3$, yielding a calculated value of ~10 W. To improve efficiency, these eddy current losses could be greatly mitigated with sheet perforations, strip layering, or other techniques.

The electromagnetic radiation produced from the system may be determined from either accurately measuring the temporal phase angle between standing wave electric and magnetic field or by accounting for all the dissipative losses then subtracting them from the total input power. If the first approach is used, the temporal phase angle $\theta_{TER}$ must be measured very close to the receiver as the angle reduces with distance. The standing wave current is directly proportional to the magnetic field and thus can be more easily measured than the emanated B-field. The output E-field at the receiver's termination can be measured with a simple wire probe. The radiation resistance in terms of phase angle is $$R_{Rad} = \frac{\sum_{i=1}^{N} \omega L_i}{\tan(\varphi_{TER})} \tag{8}$$

where $L_N$ is the total accumulative inductance of the receiver following the inductance in Eq. 4. The equipment used to measure the phase angle can be the limiting factor when applying Eq. 8. Our oscilloscope had difficulty measuring beyond 0.1 degrees with any accuracy; even with the highest time averaging. Due to this, we used the second approach given by Eq. 6. After removing the aluminum sheet and replacing it with a standard coax cable to eliminate effects of eddy currents, $R_{Rad}$ was determined to be 0.425Ω corresponding to a radiated power of 0.1 W at the input of the receiver (about the same radiated power of a cell phone but with a frequency three orders of magnitude lower). This is the same radiated power predicted by the mathematical model of FIG. 1b when the simulated source voltage (35.4V) is multiplied by the end terminal current of the helix (2.9 mA) as these two parameters are temporally in phase. In practice, however, the end terminal current of the receiver is very difficult to measure without changing the operating parameters of the system.

The basic equation for efficiency η, neglecting losses in the source, is given by $$\eta = \frac{P_L}{P_{IN}} = \frac{R_{Load}}{R_{Wire} + R_{Rad} + R_{Eddy} + R_{Load}} \quad (9)$$

where $P_L$ is the power consumed in the load (25 W or 50 W) as correlated with the relative irradiance. The efficiency of the system is plotted in FIG. 3b for various layers of insulation starting at zero with bare aluminum. Each insulation layer consisted of a 61 μm thick polypropylene sheet that was inserted between the receiver and aluminum foil. The maximum efficiency obtained was 83% with two insulation layers (or 122 μm thick polypropylene neglecting air pockets) for a 50 W load. This improvement in efficiency may be due to a better impedance matching between the source and receiver with a slight reduction in eddy currents.

The frequency response of the system was plotted using the electric field (E-field) maxima present at the top (termination) of the receiver for a 25 W and 50 W load. This field was measured with a wire probe at a distance of 25 cm. With no load connected and driven at resonance, the measured resonant frequency of the system was 2.408 MHz with a quality factor of 153. We anticipate that most applications will always have an attached load, making such an unloaded and resonating situation a rare occurrence. When the loads were connected, the resonant frequency reduced to 2.39 MHz and the quality factor changed. The area under the Quality factor curve essentially gives a measure of the stored energy inside the coil as a function of load for the same input voltage. It also points to the limit of maximum load driving capability for a fixed input voltage where, for a low enough Q, the energy stored would become negligible and the system would cease to resonate. Such a response is characteristic of a driven damped harmonic oscillator where the load is internal to the resonator and the power transfer efficiency for a given load is proportional to the Q-factor of the system. The large frequency shift occurs due to the mutual inductance interaction between equivalent lumped inductances $L_1$ and $L_2$ (referring to the inductances in FIG. 23) where the value of load dictates the amount of mutual coupling seen between the two inductances. If the winding direction of $L_2$ was reversed, the frequency would shift up instead of down with attached load.

The magnitude of the measured E-field also significantly reduced when the load was connected. 3D surface plots of the emanating E-field distribution around the receiver were simulated in MATLAB. The E-field magnitude recedes rapidly with distance away from the receiver. The average E-field spanning the area around the receiver is small and well within safety standards for public exposure to electromagnetic fields due to the field's rapid decay. As the receivers are reduced in size, the effective average E-field magnitude over the area will also reduce. At the present system efficiency of 83%, a power transmission of 10 W requires an applied voltage of 24 $V_{RMS}$ to the bare aluminum sheet, allowing the system to function within safety standards for low-voltage operation. By further reducing internal losses, greater power may be delivered for the same low-voltage input. If the aluminum sheet is insulated, the system power may be safely increased to well past 50 W. Usage of a 61 μm thick polypropylene film gave a contact potential of 10 $V_{RMS}$ when 144 $V_{RMS}$ was applied to the sheet. In addition to the detuning phenomenon discussed earlier, it should be noted that the negative terminal of the source is not used in this system which further increases the safety aspect for this form of power transmission. Pouring tap-water or soft-drinks over the insulated aluminum sheet showed no alteration in delivered output operation with the spilled fluids completely harmless to human contact.

We have had great success in converting everyday objects into single contact locations through the connection of an AC power signal. The measured transmission efficiency of the larger objects was found to be approximately 40% without any modifications or source compensation. This is mainly due to the large capacitive loading ($C_{SHEET}$ of FIG. 23) these objects present to the source which increases the driving current, generating more losses in the system. Placing the helical receiver inside the desk greatly reduced the power delivered to the load through Faraday shielding. This can be overcome by energizing a separate conducting surface inside the desk or cabinet while keeping the desk itself unconnected or floating. Power may then be delivered to the receiver through the connection of both inner and outer surfaces.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A receiver for receiving energy from a conductive object having a changing electrical voltage supplied by a source, the conductive object comprising a tank circuit, a first end of the receiver being configured to be placed into direct electrical connection with the conductive object via a single contact and the receiver having an inductance and stray capacitance configured to be excited into resonance by the electrical connection to the conductive object when the changing electrical voltage supplied by the source to the conductive object causes the resonance within the receiver, and to generate via the resonance a voltage within the receiver, and the receiver is configured to connect to a device to power the device using the resonance of the receiver.

2. The receiver of claim 1, wherein the receiver has a connection for connecting to the device, and the connection comprises a first electrical junction and a second electrical junction for connecting the device between the first and second junctions.

3. The receiver of claim 2, wherein at least a portion of the inductance of the receiver is disposed between the first and second electrical junctions.

4. The receiver of claim 3, wherein at a frequency of the resonance the impedance of the portion of the inductance disposed between the first electrical junction and the second electrical junction functionally matches an impedance of a load provided by the device when the device is connected between the first and second junctions.

5. The receiver of claim 3 or claim 4, wherein the first junction is located at the first end of the receiver and the second junction is located at a position intermediate the first end and a second end of the receiver.

6. The receiver of claim 3 or claim 4, wherein the first junction is located at a position intermediate the first end and a second end of the receiver and the second junction is located at the second end of the receiver.

7. The receiver of claim 3 or claim 4, wherein the first junction and the second junction are each located intermediate the first end and a second end of the receiver.

8. The receiver of claim 3 or claim 4, wherein the first junction is located at the first end of the receiver and the second junction is located at a second end of the receiver.

9. The receiver of claim 2, wherein the connection for connecting to the device is in series with the inductance of the receiver.

10. The receiver of claim 1, wherein the receiver is configured to emit a magnetic field to couple to a magnetic coupling element connected to the device and to transmit energy from the receiver to the magnetic coupling element through the magnetic field coupling to power the device.

11. The receiver of claim 1, wherein the receiver is configured to emit an electric field to couple to an electrostatic coupling element connected to the device and to transmit energy from the receiver to the electrostatic coupling element through the electric field coupling to power the device.

12. The receiver of claim 1, wherein the receiver comprises a coil.

13. The receiver of claim 1, wherein the receiver is configured to be movable over at least a portion of the conductive object.

14. The receiver of claim 13, wherein the receiver is configured to be at least intermittently in electrical connection to the conductive object when in motion over the at least a portion of the conductive object.

15. The source configured to supply a changing electrical voltage to the conductive object to excite into resonance the receiver as claimed in claim 1 that is connected to the conductive object.

16. The source of claim 15, wherein the source is configured to supply the changing electrical voltage to the conductive object at multiple frequencies to excite into resonance multiple receivers including the receiver connected to the conductive object.

17. The source of claim 15, wherein the source is configured to supply the multiple frequencies sequentially.

18. The source of claim 15, wherein the source is configured to supply the multiple frequencies simultaneously.

19. A method for transmitting electrical energy, comprising:

supplying, by a source, electrical energy to a first portion of a conductive object comprising a tank circuit, the conductive object having an accumulative spatial distribution of self-inductance and an accumulative spatial distribution of stray capacitance to excite at least a second portion of the conductive object into resonance to produce an electrical standing wave around at least the second portion of the conductive object, the resonance being dependent on the accumulative spatial distribution of self-inductance and the accumulative spatial distribution of self-capacitance; and obtaining, by a receiver in direct electrical connection with the conductive object via a single contact, electrical energy from the electrical standing wave at the receiver, wherein the receiver is connected to a location at the second portion of the conductive object.

20. A method for transmitting electrical energy, comprising:

supplying, by a source, electrical energy to a first portion of a conductive object by connecting the first portion of the conductive object into a circuit supplying a changing electrical current through the first portion of the conductive object, the conductive object comprising a tank circuit, the conductive object having a self-inductance and stray capacitance, the supply of changing electrical current through the first portion of the conductive object exciting the self-inductance and stray capacitance into resonance, the resonance including a changing electrical current or voltage at a second portion of the conductive object, and obtaining, by a receiver of a plurality of receivers, electrical energy from the resonance at the receiver, wherein each of the plurality of receivers are in direct electrical connection with the conductive object via a single respective contact, the resonance is one of a plurality of resonances which corresponds to the receiver, and wherein the receiver is connected to a location at the second portion of the conductive object.

21. The method of claim 20, wherein the self-inductance has an accumulative spatial distribution and the self-capacitance has an accumulative spatial distribution; and the resonance is dependent on the accumulative spatial distribution of self-inductance and the accumulative spatial distribution of self-capacitance and produces a standing wave around at least the second portion of the conductive object.

22. The method of any one of claims 19-21, wherein the receiver is put into resonance from the received electrical energy around the surface of the conductive object.

23. The method of any one of claims 19-21, wherein the receiver comprises a connector to connect the device to receive energy directly from the conductive object.

24. The method of any one of claims 19-21, wherein the receiver comprises a pair of connectors to connect the device to a pair of locations on the object to receive energy directly from the conductive object.

25. The method of claim 20, wherein the resonance comprises multiple frequencies.

26. The method of claim 20, further comprising obtaining electrical energy from the resonance of the object at one or more additional receivers each located at respective additional locations at the conductive object.

27. The method of claim 26, wherein the receiver connected to the location at the second portion receives electrical energy at a first frequency, and each additional receiver at a respective additional location receives electrical energy at a different respective frequency, and the source is configured to supply electrical energy at the first frequency and each of the different respective frequencies simultaneously.

28. The method of claim 26, wherein the receiver connected to the location at the second portion receives electrical energy at a first frequency, and each additional receiver at a respective additional location receives electrical energy at a different respective frequency, and the source is configured to supply electrical energy at one frequency at a time, and to supply electrical energy at each of the different respective frequencies in turn.

29. The method of claim 20, wherein the receiver is mobile over at least a section of the conductive object.

* * * * *